US012539595B2

(12) United States Patent
Berkowitz-Mitchell et al.

(10) Patent No.: US 12,539,595 B2
(45) Date of Patent: Feb. 3, 2026

(54) SYSTEM AND WORKSTATION FOR PERFORMING A TASK ON A WORKPIECE

(71) Applicant: Shaper Tools, Inc., San Francisco, CA (US)

(72) Inventors: Noah Paden Berkowitz-Mitchell, Oakland, CA (US); Gregory William Howe, Larkspur, CA (US); Aditya Rao, Oakland, CA (US); Nico Walker, Wendlingen (DE); Joseph J. Hebenstreit, San Francisco, CA (US); Shawn Mitchell Kirsch, Oakland, CA (US); Michael Raj Kubba, San Mateo, CA (US); Ilan Ellison Moyer, Chapel Hill, NC (US)

(73) Assignee: Shaper Tools, Inc., San Francisco, CA (US)

( * ) Notice: Subject to any disclaimer, the term of this patent is extended or adjusted under 35 U.S.C. 154(b) by 301 days.

(21) Appl. No.: 17/904,402

(22) PCT Filed: Feb. 17, 2021

(86) PCT No.: PCT/US2021/070160
§ 371 (c)(1),
(2) Date: Aug. 17, 2022

(87) PCT Pub. No.: WO2021/168475
PCT Pub. Date: Aug. 26, 2021

(65) Prior Publication Data
US 2023/0083204 A1    Mar. 16, 2023

Related U.S. Application Data

(60) Provisional application No. 62/977,979, filed on Feb. 18, 2020.

(51) Int. Cl.
*B25H 1/10* (2006.01)
*B23Q 3/06* (2006.01)
*B25H 1/04* (2006.01)

(52) U.S. Cl.
CPC ............... *B25H 1/10* (2013.01); *B23Q 3/06* (2013.01); *B25H 1/04* (2013.01)

(58) Field of Classification Search
CPC .......... B23Q 1/74; B23Q 3/106; B23Q 3/105; B23Q 3/107; B25H 1/0035; B25H 1/005;
(Continued)

(56) References Cited

U.S. PATENT DOCUMENTS

| | | | | |
|---|---|---|---|---|
| 2,696,765 A | * | 12/1954 | Appleton | B23Q 3/102 411/80.6 |
| 4,090,727 A | * | 5/1978 | Busch | E05C 19/105 292/111 |
| 4,867,621 A | * | 9/1989 | Morghen | B23Q 3/108 409/218 |

(Continued)

FOREIGN PATENT DOCUMENTS

CN    108213601    6/2018

OTHER PUBLICATIONS

International Search Report for PCT/US2021/070160 mailed on May 6, 2021 (2 pages).
(Continued)

*Primary Examiner* — Tyrone V Hall, Jr.
(74) *Attorney, Agent, or Firm* — Almanac IP Advisors LLP

(57) ABSTRACT

Workstation for performing a task on a workpiece using a tool. Some implementations of the invention allow an adjustable shelf to be used to position a workpiece on the workstation. Some implementations of the invention include a support bar for partially supporting a tool as the task is performed on a workpiece coupled to the workstation. Some implementations of the invention allow a workpiece to be
(Continued)

positioned at a reference location or orientation relative to the workstation. Some implementations of the invention allow a tool to perform an action based on determining the position of the tool relative to the workstation using computer vision techniques to analyze a feature of the workstation.

20 Claims, 24 Drawing Sheets

(58) Field of Classification Search
 CPC ........ B25H 1/14; B25H 1/02–10; B25H 1/18;
  B25H 3/04; B25H 3/06
 See application file for complete search history.

(56) References Cited

U.S. PATENT DOCUMENTS

| | | | |
|---|---|---|---|
| 5,078,373 A | * | 1/1992 | Miller ................... B27B 27/02 |
| | | | 269/303 |
| 5,119,742 A | | 6/1992 | Simmie |
| 5,174,349 A | | 12/1992 | Svetlik et al. |
| 5,647,707 A | | 7/1997 | Poulin |
| 5,653,273 A | | 8/1997 | Bach |
| 5,809,631 A | * | 9/1998 | Poulin ..................... B25H 1/00 |
| | | | 409/203 |
| 8,794,580 B1 | | 8/2014 | Koehler |
| 2018/0126507 A1 | | 5/2018 | Rivers et al. |
| 2019/0232452 A1 | | 8/2019 | Henn |
| 2019/0291263 A1 | * | 9/2019 | Fuller ..................... B25H 1/12 |

OTHER PUBLICATIONS

Written Opinion for PCT/US2021/070160 mailed on May 6, 2021 (7 pages).
Extended European Search Report for EP 21757064.7 mailed on Feb. 27, 2024 (8 pages).
Notification of the First Office Action for CN Application No. 202180015027.6 mailed on Mar. 30, 2025, 10 pages.

* cited by examiner

FIG. 4
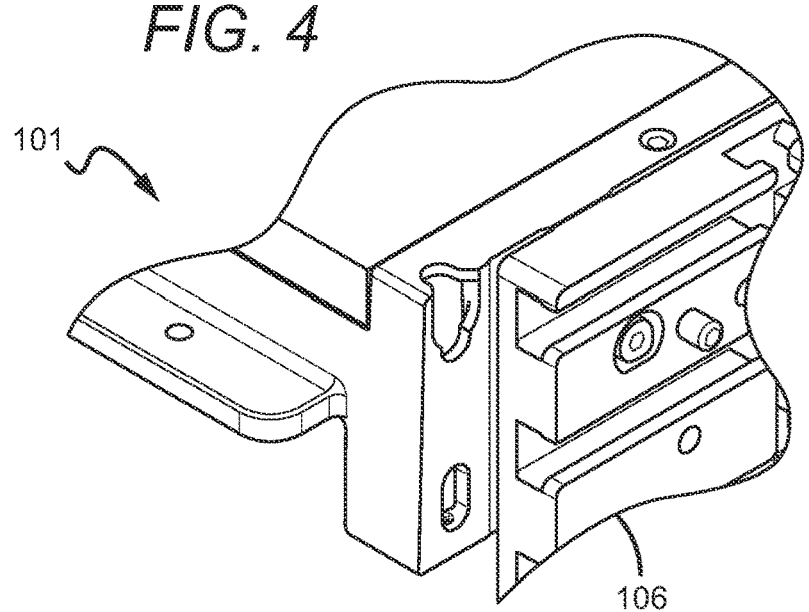
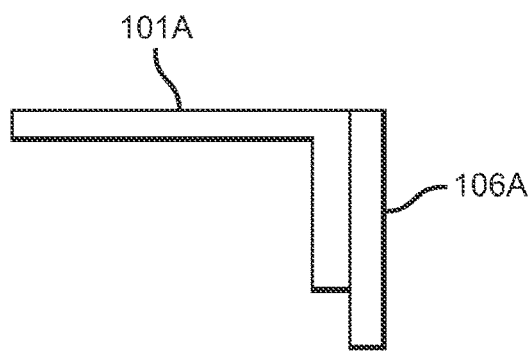
FIG. 5A
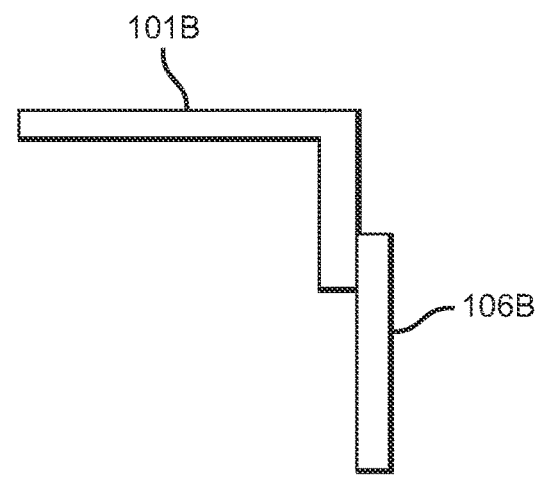
FIG. 5B
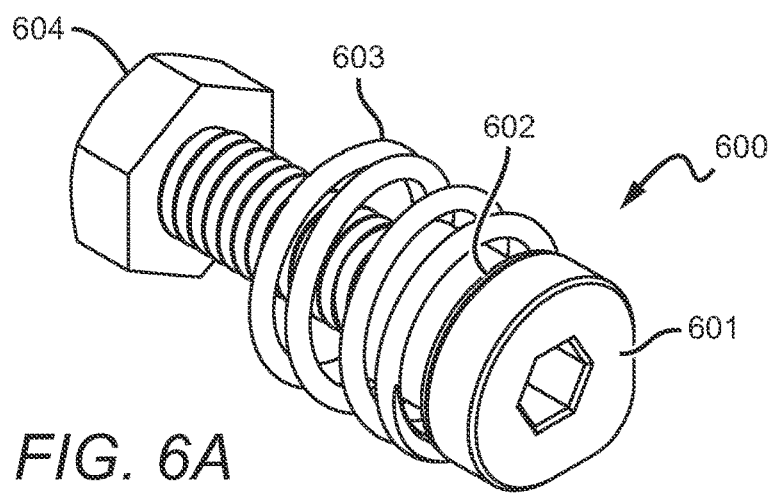
FIG. 6A

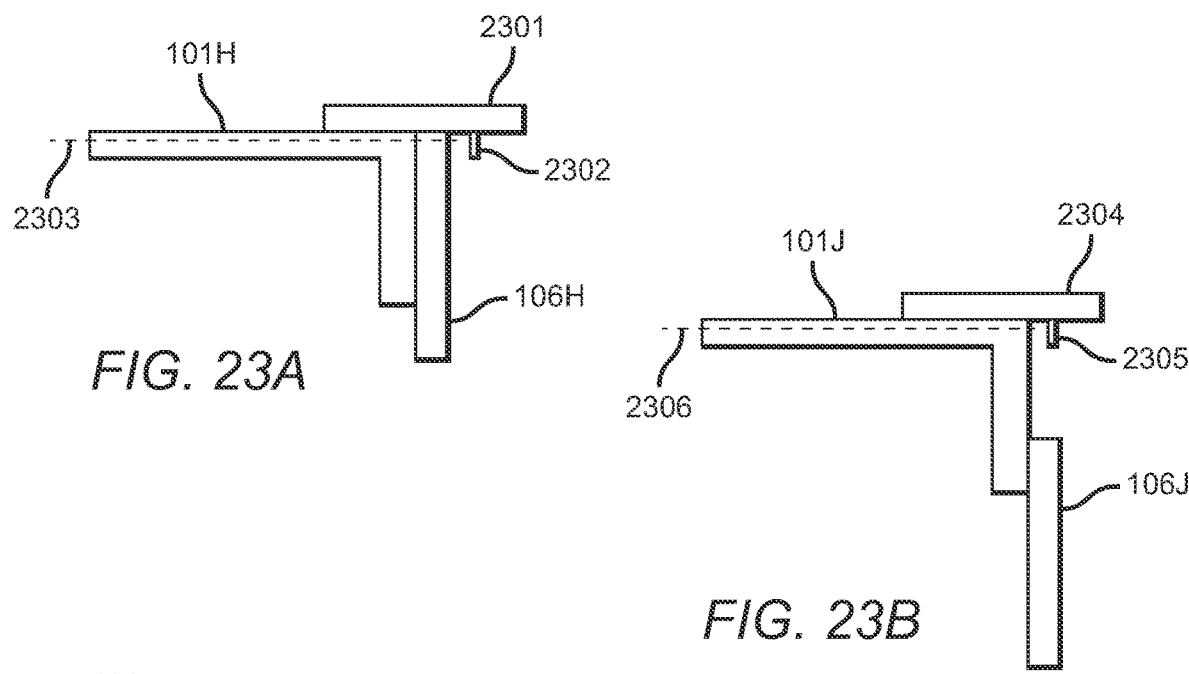
FIG. 23A
FIG. 23B
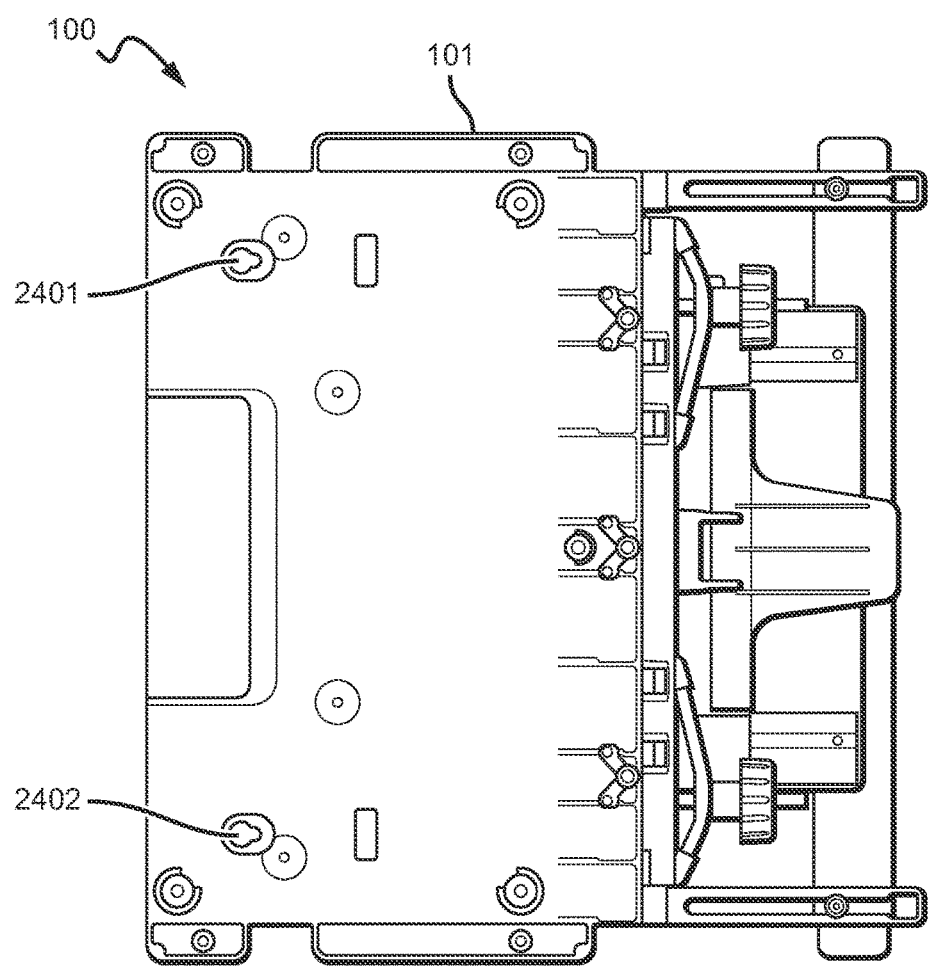
FIG. 24

SYSTEM AND WORKSTATION FOR PERFORMING A TASK ON A WORKPIECE

REFERENCE TO PRIORITY APPLICATIONS

This application is the National State Entry of International Application No. PCT/US2021/070160, filed on Feb. 17, 2021, which claims the benefit of priority to U.S. Provisional Application No. 62/977,979, filed on Feb. 18, 2020, both of which are incorporated by reference herein in their entirety.

BACKGROUND

Field of the Disclosure

The disclosure relates generally to workstations for performing a task (e.g., cutting, drilling, sanding, drawing) on a workpiece using a tool (e.g., a corded router, a wireless drill, a handsaw). In some embodiments, the workstation is used to keep the workpiece fixed while the tool is moved relative to the workpiece to perform the task. In such embodiments, the workstation acts like a fixture for the workpiece. In some embodiments, the workstation is used to keep a power tool fixed while the workpiece is moved relative to the power tool to perform the task. In such embodiments, the workpiece may be moved relative to the power tool using a jig.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Fixtures, such as vises, clamps, and the like, for use in woodworking and machining have been known for centuries. Fixtures are used to hold a workpiece while work is performed by one or more tools. Fixtures may be customized to hold the workpiece at a certain angle or at a certain location (relative to the fixture) to make it easier to perform a task using a tool. For example, a custom fixture may be designed to hold the leg of a table to fabricate the tenon at an angle on one end of the leg to fit into a mortise formed on the tabletop. In another example, a custom fixture may be designed to hold a workpiece to form a finger joint if the workpiece is used to build a drawer.

It is not uncommon to create different, custom fixtures to perform different tasks on different workpieces or even to create different, custom fixtures to perform different tasks on the same workpiece. In some instances, the requirement to create a custom fixture is motivated by differences in workpiece geometry (e.g., length of workpiece is much larger than width or height). In some instances, the requirement to create a custom fixture is motivated by the specific task that needs to be performed on the workpiece (e.g., cutting at a specific angle).

One of the factors that drives the need to create custom fixtures relates to the requirement of positioning a workpiece (for example, starting stock) at a certain position or with a certain orientation repeatably with respect to the fixture. Similarly, during fabrication, a workpiece may need to be removed from the fixture and returned to the fixture and placed in the same position or orientation.

SUMMARY OF THE DISCLOSURE

The workstation of the present disclosure may be used for performing a task on a workpiece using a tool. Some embodiments of the workstation accommodate workpieces of different sizes and aspect ratios, including workpieces that are thin and long (e.g., 1"×1"×2') and thin and large (e.g., 1"×2'×3'). Some embodiments of the workstation permit alignment of a workpiece against one or more features of the workstation to reference the workpiece in a known location relative to a feature of the workstation. In some embodiments, the workstation includes support arms and a support bar. In some embodiments, the workstation includes one or more datum pins to reference a workpiece. In some embodiments, the workstation includes an adjustable shelf In some embodiments, the workstation is designed to accommodate clamps and accessories to secure a workpiece to the workstation. In some embodiments, a datum pin may be recessed into the workstation.

In some embodiments, the modular configurability of the workstation permits mounting of larger workpieces while still providing the ability to work with and align smaller workpieces. In some embodiments, the design of the workstation permits accurate positioning of one or more removable components and permits accurate alignment of a workpiece to the workstation. In some embodiments, components may be mounted to and removed from the workstation using fasteners that secure the components through less than one turn of the fastener.

The disclosed systems, methods, and non-transitory computer-readable media describe the triggering of an action based on the proximity of a tool component to a component of a workstation. In some embodiments, a system may sound an audible alarm, display a message, or retract a cutting bit of a tool if the cutting bit approaches a component of the workpiece (e.g., the cutting bit approaches a support arm as a cutting task is performed on a workpiece). In some embodiments, the positional relationship between a component of the tool and a component of the workstation is determined by imaging a feature of the workstation and using the image data to calculate the positional relationship. In some embodiments, a zone may be determined based on the position of a component of the workstation, and the position of a component of the tool relative to the zone may be used to trigger an action.

BRIEF DESCRIPTION OF THE DRAWINGS

FIG. 4 shows the close-up view from FIG. 3 with a clamping face mounted to the body.

FIGS. 5A and 5B each show a cross-section schematic view of an exemplary coupling configuration of a body and a clamping face.

FIGS. 6A-C show views of a lock screw which may be used to mount a workstation component to another workstation component.

FIGS. 23A and 23B each show a cross-section view of tool components on a workstation with the workstation have an exclusion zone.

FIG. 24 shows a bottom view of a workstation.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Figure 1:
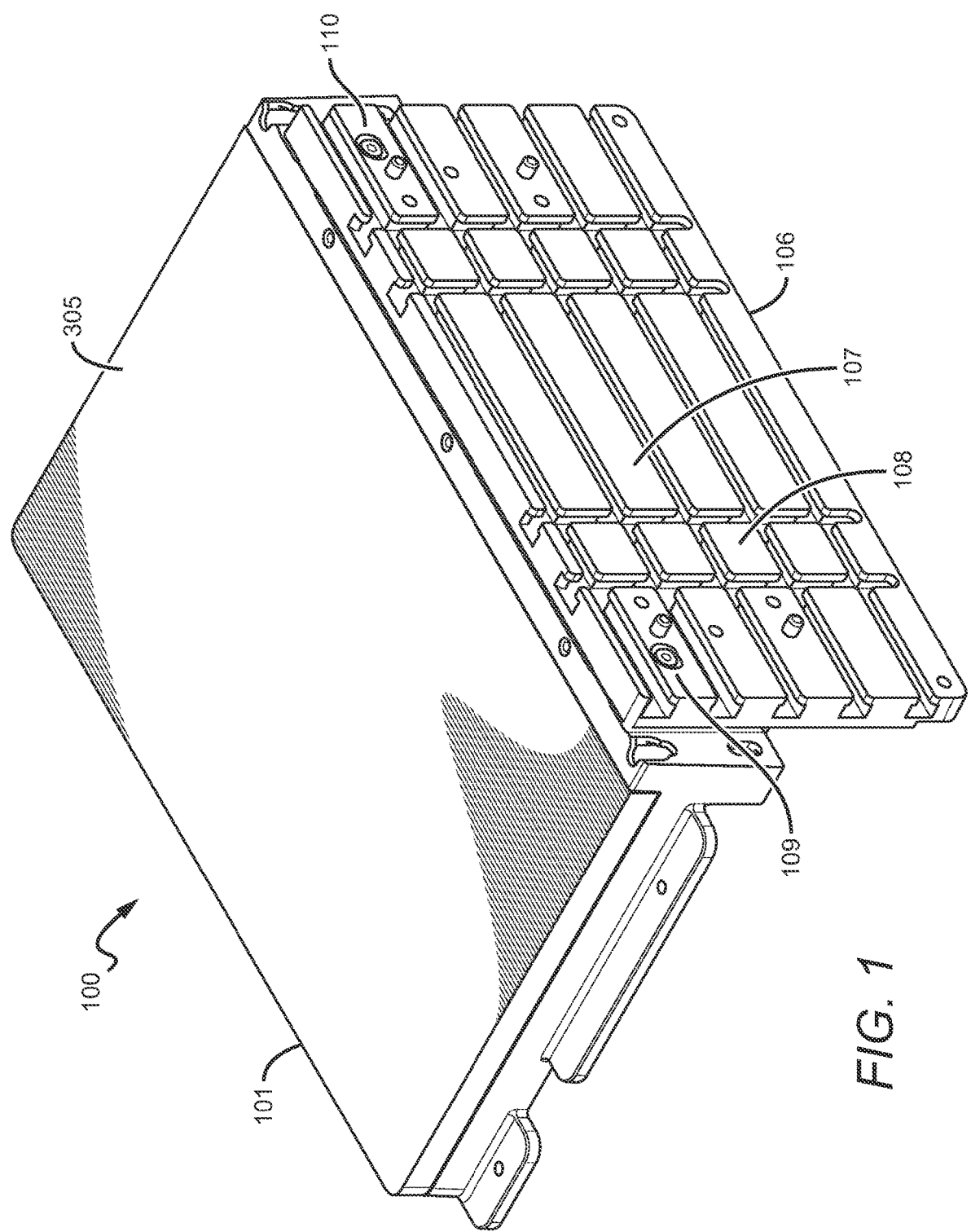
FIG. 1 shows an exemplary embodiment of a workstation.
Figure 2:
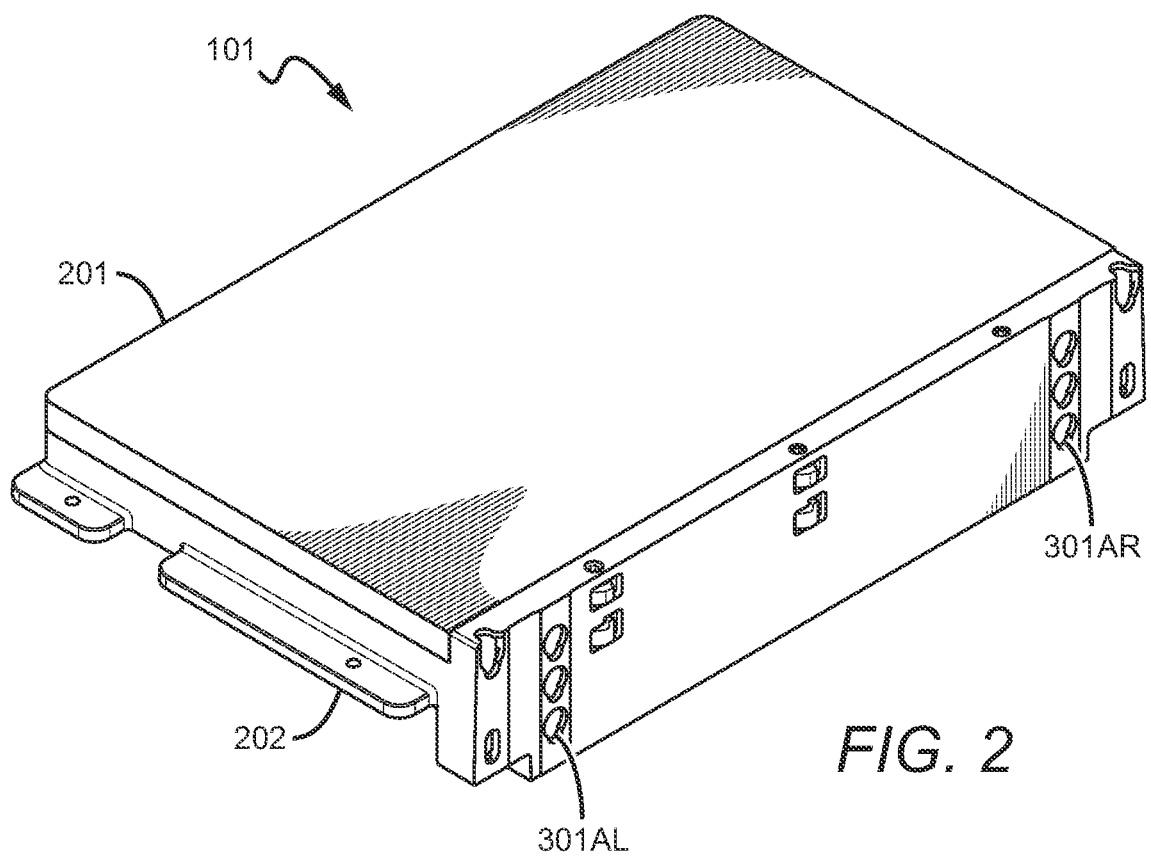
FIG. 2 shows an exemplary embodiment of a body of a workstation.

The workstation of the present disclosure may be placed on top of a workbench with a portion of the workstation hanging over an edge of the workbench. In some embodiments, a component of the workstation may be secured to the workbench using a fastener or a clamp. FIG. 1 shows an exemplary embodiment of a workstation 100. Workstation 100 comprises a body 101 and a clamping face 106. In some embodiments, workstation 100 is placed on a workbench (not shown) with body 101 on the workbench top surface with clamping face 106 positioned adjacent to an edge of the workbench. As depicted in FIG. 2, in some embodiments, body 101 comprises a body base 202 with a body top 201 coupled to the body base 202. In some embodiments, a portion of the top surface of the body 101 (e.g., top surface of body top 201) defines a reference surface for the workstation 100. In some embodiments, slots (e.g., slots similar to slots 1501, 1502 on clamping face 106 in FIG. 15A; not shown) cut into the body top 201 may yield one or more reference surface portions that are substantially in the same plane (see for example mounting surface portions 107 and 108 of clamping face 106—in FIG. 1).

Figure 26:
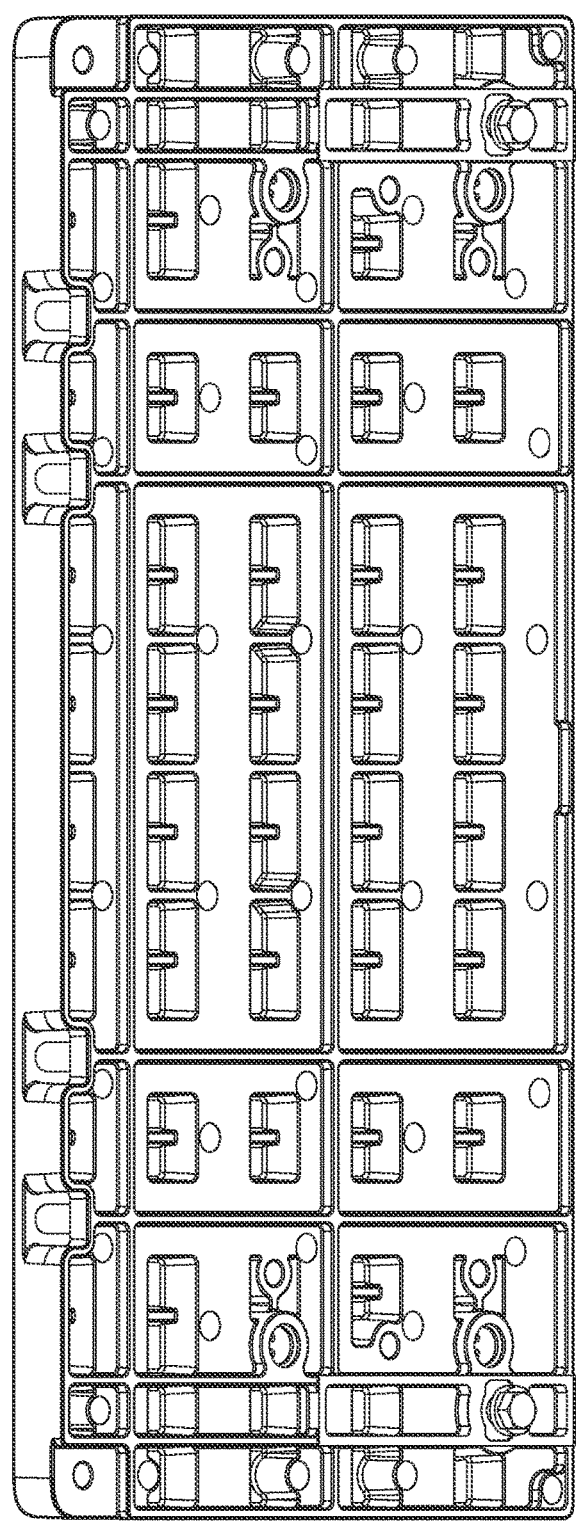
FIG. 26 shows a photograph of a surface opposite a mounting surface of a clamping face.

In some embodiments, body base 202 is made of aluminum. In some embodiments, body top 201 is made out of aluminum, wood, medium-density fibreboard (MDF), or the like. In some embodiments, clamping face 106 is made of aluminum. In some embodiments, the clamping face 106 is made of 30 mm, 25 mm, 20 mm, or 15 mm thick aluminum to maintain flatness of the mounting surface portions 107 and 108. In some embodiments, material from a workstation component (e.g., body, clamping face) may be removed to reduce the weight of the workstation component. For example, as shown in FIG. 26, material from the side opposite the mounting surface may be removed to reduce the weight of the clamping face. In some embodiments, as shown in FIG. 26, the pattern of material removed may be designed to reduce weight without impacting rigidity of the component.

Figure 11A:
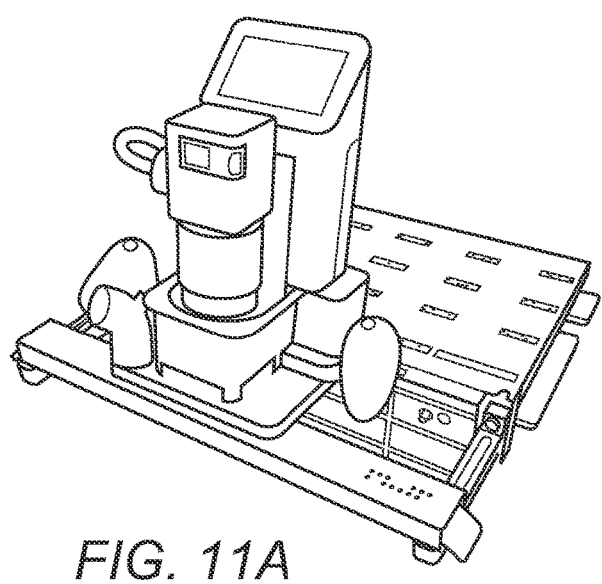
FIGS. 11A and 11B each show a computer-controlled router on a workstation.
Figure 11B:
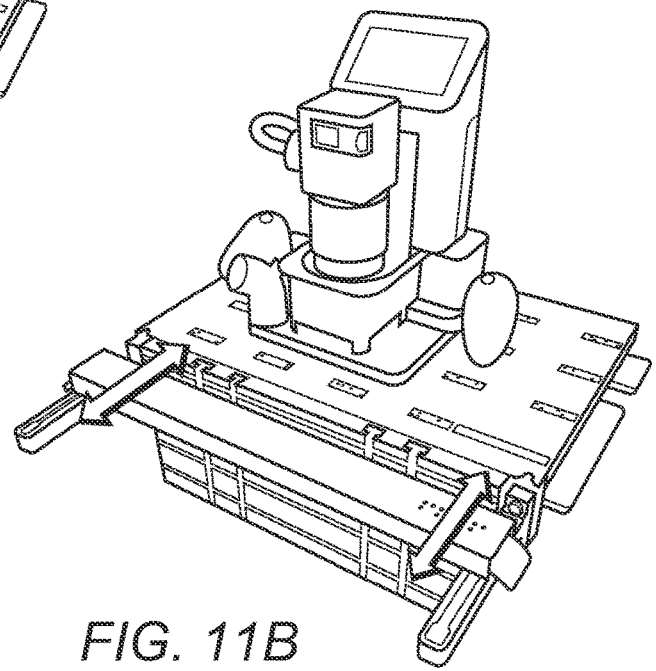

In some embodiments, markers are depicted on the reference surface (see, for example, FIGS. 11A, 11B). In some embodiments, markers may be computer-readable patterns (e.g., dominos, QR codes, bar codes) that can be recognized by a computer system (e.g., computer system 2500) including one or more cameras utilizing computer vision (e.g., image-based localization, localization based on solving the perspective-n-point problem). In some embodiments, a film or sticker is applied to the top surface of the body top 201. In some embodiments, markers are depicted on the film or sticker. In some embodiments, markers on the reference surface may be used by tools for positioning the tool with respect to the workstation. For example, a computer guided tool (e.g., Shaper Origin) uses markers for positioning the bit on a desired path relative to the workpiece as the computer guided tool is moved by a user as described in U.S. Patent Publication No. 20190196438 (also published as WIPO Publication No. WO 2018/035499), with international filing date of Aug. 18, 2017, incorporated by reference in its entirety.

Figure 3:
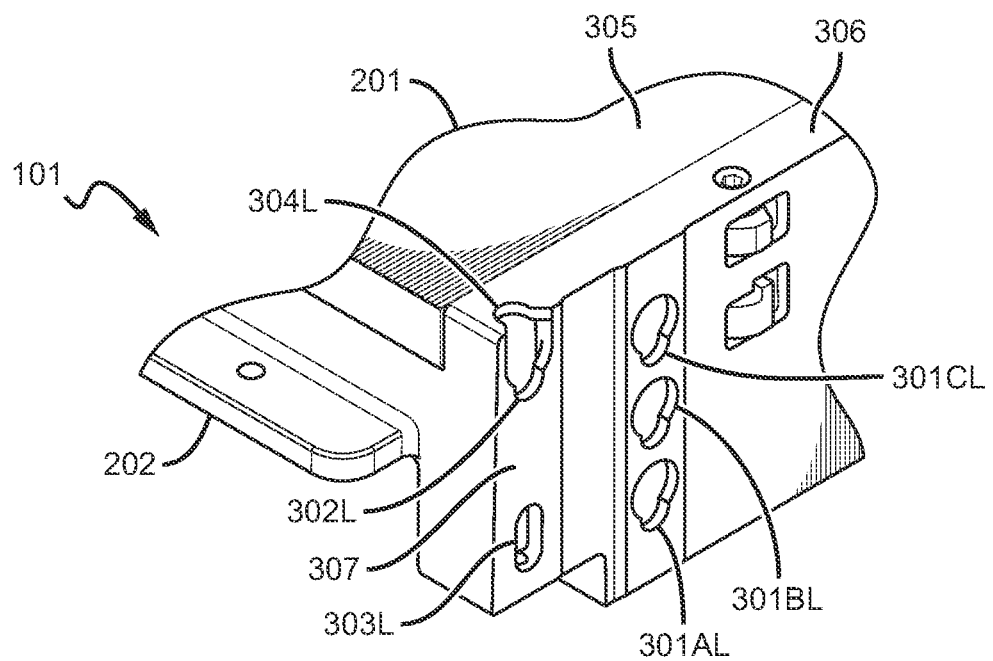
FIG. 3 shows a close-up view of an exemplary embodiment of a body of a workstation.

In some embodiments, the topmost surface of body 101 may be used as a reference surface. For example, as depicted in FIG. 3, a reference surface 305 of body top 201 may be adjusted to lie above the top surface 306 of body base 202. In some embodiments, reference surface 305 of body top 201 is higher than top surface 306 of body base 202 by 5 mil, 3 mil, 1 mil, 0.5 mil, or 0.1 mil (1 mil is equal to one-thousandth of an inch, 25.4 microns).

FIG. 3 shows a close-up view of the left side of body 101. In some embodiments, body 101 includes mounts 301AL, 301BL, and 301CL (and corresponding mounts on the right side of the body 101, not shown in FIG. 3) for attaching clamping face 106 to the body 101. For example, in one coupling configuration, clamping face 106 may be mounted to body 101 using mount 301AL and the lowest corresponding mount on the right side of body 101 (not shown in FIG. 3; shown as 301AR in FIG. 2) and lock screws 109 and 110 (coupled to the clamping face 106) in FIG. 1. Mount 301AL and the lowest corresponding mount on the right side of body 101 may be referred to as the lowest set of mounts for the clamping face 106. This coupling configuration is depicted in the cross-section schematic shown in FIG. 5B with body 101B and clamping face 106B.

In another coupling configuration, as depicted in FIG. 4, clamping face 106 may be mounted to body 101 using mount 301CL (e.g., with lock screw 109 in FIG. 1) and the highest corresponding mount on the right side of body 101 (e.g., with lock screw 110 in FIG. 1; not shown in FIG. 3). Mount 301CL and the highest corresponding mount on the right side of body 101 may be referred to as the highest set of mounts for the clamping face 106. This coupling configuration is depicted in the cross-section schematic shown in FIG. 5A with body 101A and clamping face 106A.

Figure 27:
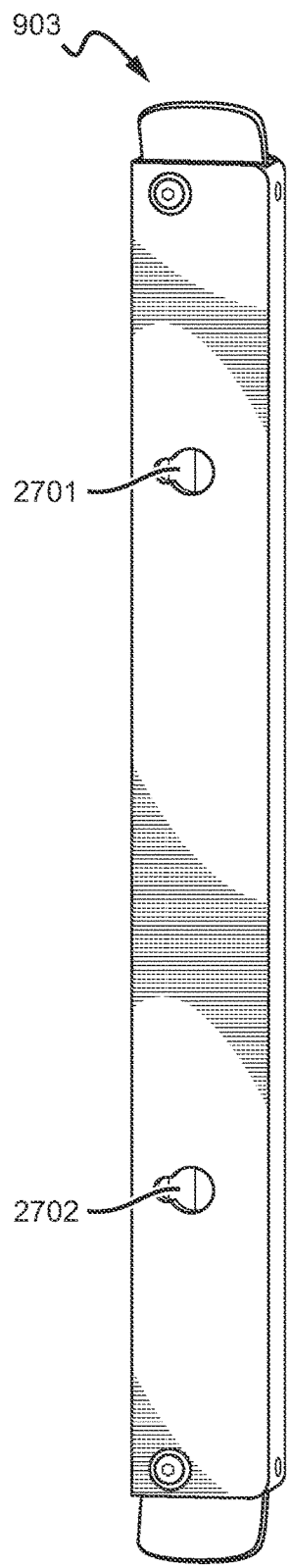
FIG. 27 an alignment surface portion of a support bar.

In some embodiments, one or more components of the workstation may be attached to another component of the workstation when moving the workstation or during shipment of the workstation. For example, as shown in FIG. 24, the body 101 may have mounts 2401 and 2402 on the bottom to attach the clamping face 106 under the body during shipment of the workstation. In another example, the support bar may have a mount to attach a support arm to the support bar during shipment of the workstation. In some embodiments, as shown in FIG. 27, the support bar may have one or more mounts (e.g., 2701, 2702) for attaching other workstation components or accessories (e.g., work light, dust collection bag).

In some embodiments, the clamping face may include one or more mounts and a lock screw coupled to the body may be used to attach the clamping face to the body using the mounts on the clamping face. In some embodiments, the clamping face may include one or more mounts, the body may include one or more mounts, and a lock screw may be used to couple a mount on the clamping face to a mount on the body to attach the clamping face to the body. In some embodiments, clamping face 106 may be fixed to body 101 (e.g., made out of a single piece of aluminum, clamping face press fit/interference fit to body using pins aligned to mounting holes) with a cross section as shown in FIG. 5A or FIG. 5B (e.g., to accommodate spoilboard, see below).

Figure 6B:
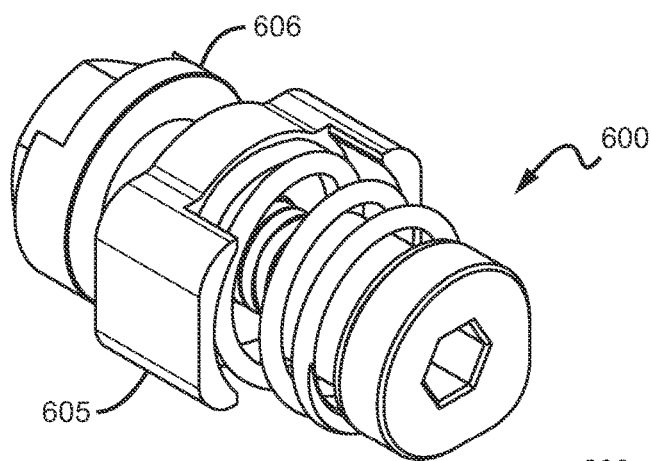
Figure 6C:
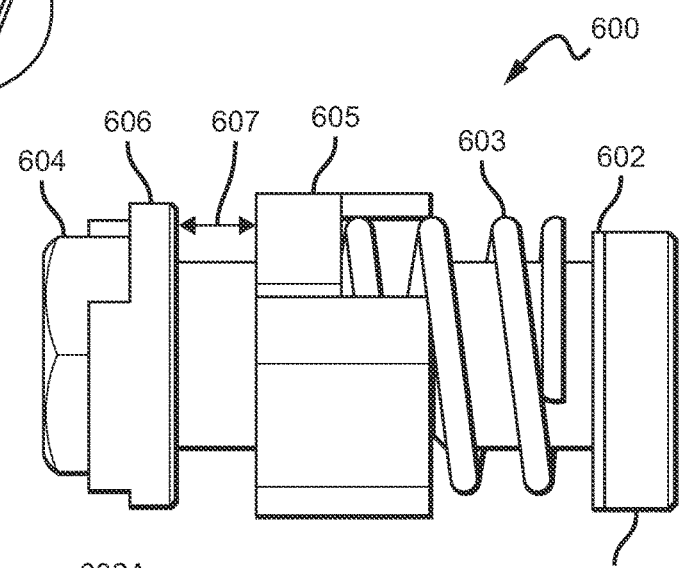

Clamping face 106 may be mounted to the body 101 using one or more fasteners. In some embodiments, clamping face 106 may be mounted to the body 101 using a lock screw which permits quick coupling and decoupling of the clamping face 106 from the body 101. For example, the lock screw may secure the clamping face 106 to the body 101 in less than one full turn of the lock screw. In some embodiments, lock screw 600 comprises lock screw head 601, lock screw washer 602, lock screw spring 603, and lock screw end 604 as shown in FIG. 6A. Lock screw head 601 and lock screw end 604 are threaded such that rotating the lock screw head 601 relative to the lock screw end 604 closes the gap between the two parts. As shown in FIG. 6B, lock screw 600 further comprises a spring retainer 605 and lock screw clamp 606. In some embodiments, spring retainer 605 and lock screw clamp 606 may be a single piece. FIG. 6C shows a side view of the lock screw 600. The position of lock screw gap 607 relative to the lock screw head 601 may be adjusted by rotating the lock screw head 601 relative to lock screw end 604.

Figure 6D:
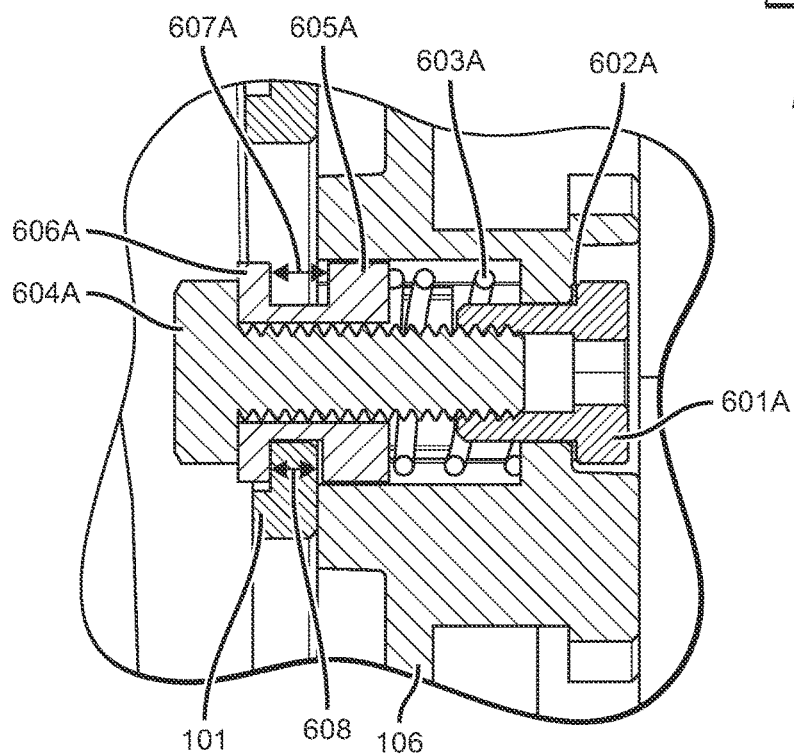
FIG. 6D shows a cross-section view of a lock screw used to mount a clamping face to a body.
Figure 6E:
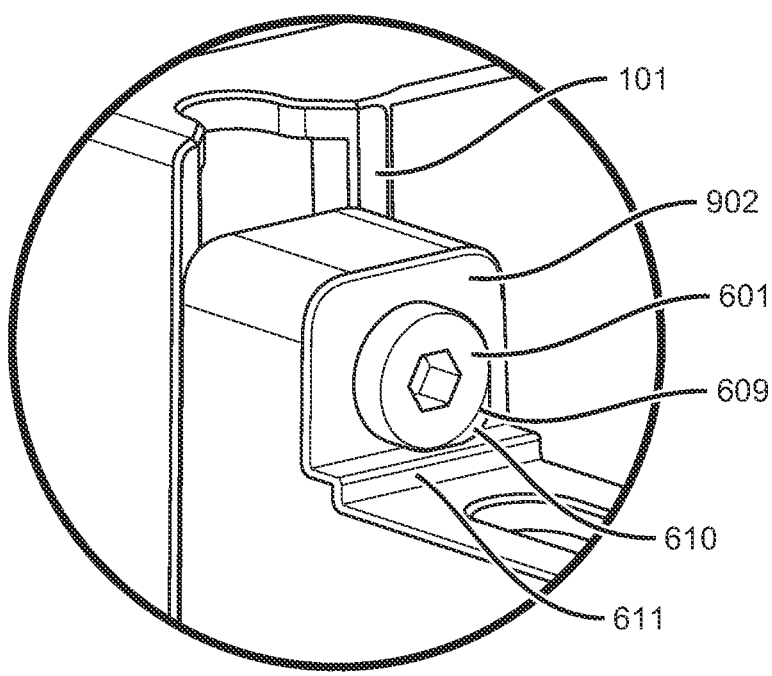
FIG. 6E shows a close-up view of a support arm mounted to a body using a lock screw.
Figure 6F:
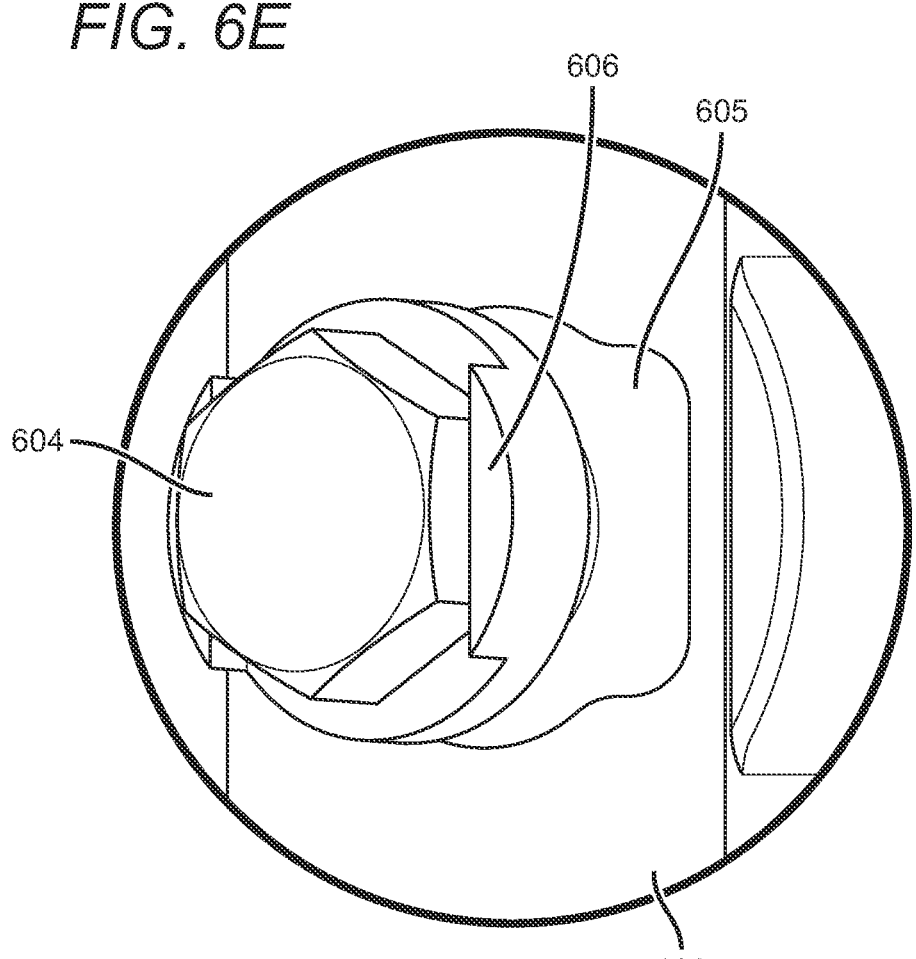
FIG. 6F shows a close-up view of a lock screw attached to a clamping face.

As depicted in the cross-section view shown in FIG. 6D, in some embodiments, lock screw head 601A and lock screw washer 602A are inserted from one side of the clamping face 106. Lock screw spring 603A, spring retainer 605A, lock screw clamp 606A are inserted from the other side of clamping face 106. In some embodiments, as shown in FIG. 6D, spring retainer 605A and lock screw clamp 606A are coupled to each other (e.g., formed as a single piece). In some embodiments, spring retainer 605 is designed to fit into a matching cutout in the clamping face 106, see FIG. 6F, such that spring retainer 605 is still free to slide in and out of the cutout but is limited in rotation about its central axis. In some embodiments, with spring retainer 605 and lock screw clamp 606 coupled to each other, lock screw end 604 fit into lock screw clamp 606, and spring retainer 605 fit into clamping face (as shown in FIG. 6F), rotation of lock screw head 601 relative to the clamping face 106 leads to closing the gap between lock screw head 601 and lock screw end 604 and prevents rotation of lock screw end 604 in the same direction of the rotation of lock screw head 601 (due to the lock screw clamp 606 preventing the rotation of lock screw end 604 because lock screw clamp 606 and spring retainer 605 are secured in the cutout in the clamping face 106).

In some embodiments, lock screw end 604A is tightened into lock screw head 601A to align the lock screw gap 607A (the gap between the surfaces of spring retainer 605A and lock screw clamp 606A, indicated by arrow 607A in FIG. 6D) with the flange 608 on the mount on body 101 in both the clamped and unclamped configurations of the lock screw. In some embodiments, the surface of lock screw clamp 606A adjacent to lock screw gap 607A engages the surface of flange 608 with less than 3, 2, or 1 turns of the lock screw head 601A relative to the lock screw end 604A. In some embodiments, as shown in FIG. 6E, lock screw head 601 is shaped to include a protrusion 609 that extends past the regular lock screw head pattern 610 (e.g., circular (as shown), hexagonal (for example, a bolt); pattern 610 added to highlight protrusion). The lock screw head protrusion 609 permits the lock screw head 601 to turn by less than one full turn (clockwise in FIG. 6E) when the lock screw head 601 is installed next to a surface 611.

In some embodiments, a controlled-thickness shim (not shown) may be inserted between the lock screw end 604A and lock screw clamp 606A during assembly of the lock screw such that the lock screw end 604A tightened against the shim (with respect to lock screw head 601A) results the lock screw gap 607A aligning with the flange 608 after the controlled-thickness shim is removed. In some embodiments, the lock screw may be secured to the clamping face (as described above with respect to FIG. 6D), the lock screw may be secured to the body, or may be separate from the body and the clamping face and used to couple the clamping face to the body. In some embodiments, the lock screw may be secured to a first component of the workstation and used to couple the first component to another component of the workstation using a mount on the other component.

In some embodiments, the lock screw end 604 and lock screw clamp 606 slide through the top, wide portion of a "key-hole" design mount (e.g., mount 301AL) and the lock screw 600 slides down into the mount such that the narrow portion of lock screw clamp 606 rests at the bottom, narrow portion of the mount. In some embodiments, the design of the mount geometry (e.g., design of mount 301AL) is cylindrical at the bottom (e.g., bottom of the "key-hole") to permit repeatable placement of lock screw component (e.g., cylindrical part of lock screw clamp 606). The fabrication tolerance for the mount on the body, the corresponding fabrication tolerance for the mating interfaces on the clamping face (e.g., for coupling with fastener (such as a lock screw)), and the arrangement of the mounts on the body (e.g., mounts 301AL and 301AR on either side of body 101 as shown in FIG. 2) permit high precision control of the clamping face position and orientation relative to the body.

In some embodiments, mounts (e.g., mounts 301AL, 301BL, 301CL, 302L) on the body 101 are machined at the same time and by the same tool (e.g., CNC)—e.g., to maintain tight relative tolerances between the mounting points. In some embodiments, mounts (e.g., mounts 301AL, 301BL, 301CL, 302L) on the body 101 are machined at the same time as when surface 307 of body 101 is machined—e.g., to maintain tight angle tolerances between the mounting points and surface 307. In some embodiments, cutouts and mounting points for components (e.g., lock screws, datum pins) on the clamping face 106 are machined at the same time and by the same tool to maintain tight relative tolerances.

Figure 22:
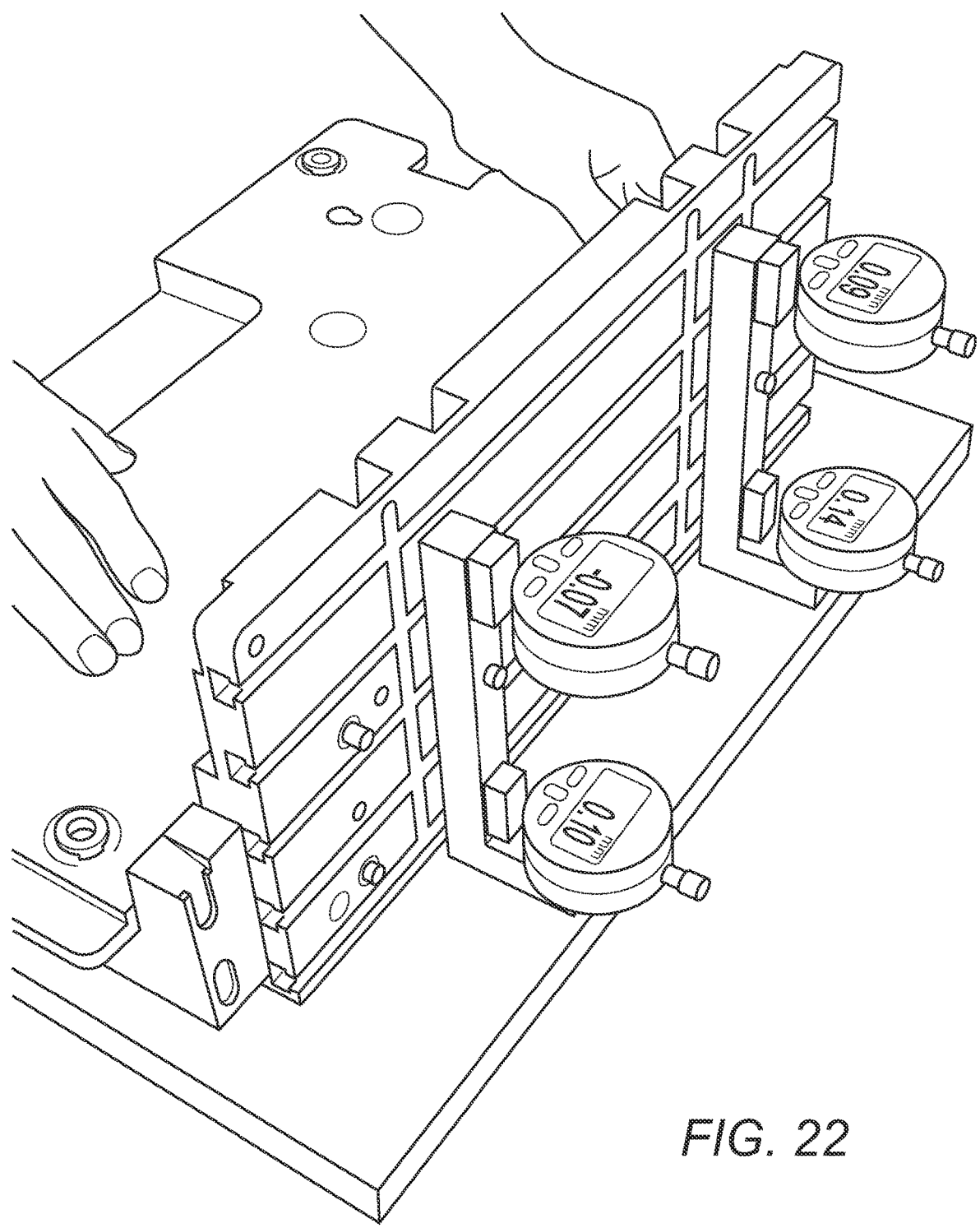
FIG. 22 shows a test fixture for measuring the angle between a reference surface and a mounting surface of a workstation.

For example, a mounting surface of the clamping face 106 may include mounting surface portions 107 and 108 in FIG. 1. In one or more coupling configurations of the body 101 and the clamping face 106, the reference surface 305 may be substantially perpendicular to each of the mounting surface portions 107 and 108. As used herein, two surfaces (e.g., planar surfaces) are "substantially perpendicular" if the angle between the normal vectors of the surfaces is 90+/−5 deg, 90+/−1 deg, 90+/−0.5 deg, 90+/−0.2 deg, 90+/−0.15 deg, or 90+/−0.1 deg. As used herein, a "normal vector" of a surface refers to a normal vector of a hypothetical, idealized plane (with each side greater than 0.5") pressed against the surface (excluding surface imperfections (e.g., scratches) or variations in the surface sub-microscopic structure). In some embodiments, the workstation is placed on a measurement jig with the clamping face attached to the body, as shown in FIG. 22, to measure the perpendicularity of the reference surface (e.g., reference surface 305) to the mounting surface (e.g., one or more mounting surface portions 107, 108). The position of one or more locations on the clamping face may be measured using height gauges on a jig to determine the orientation of the mounting surface relative to the reference surface.

Figure 7:
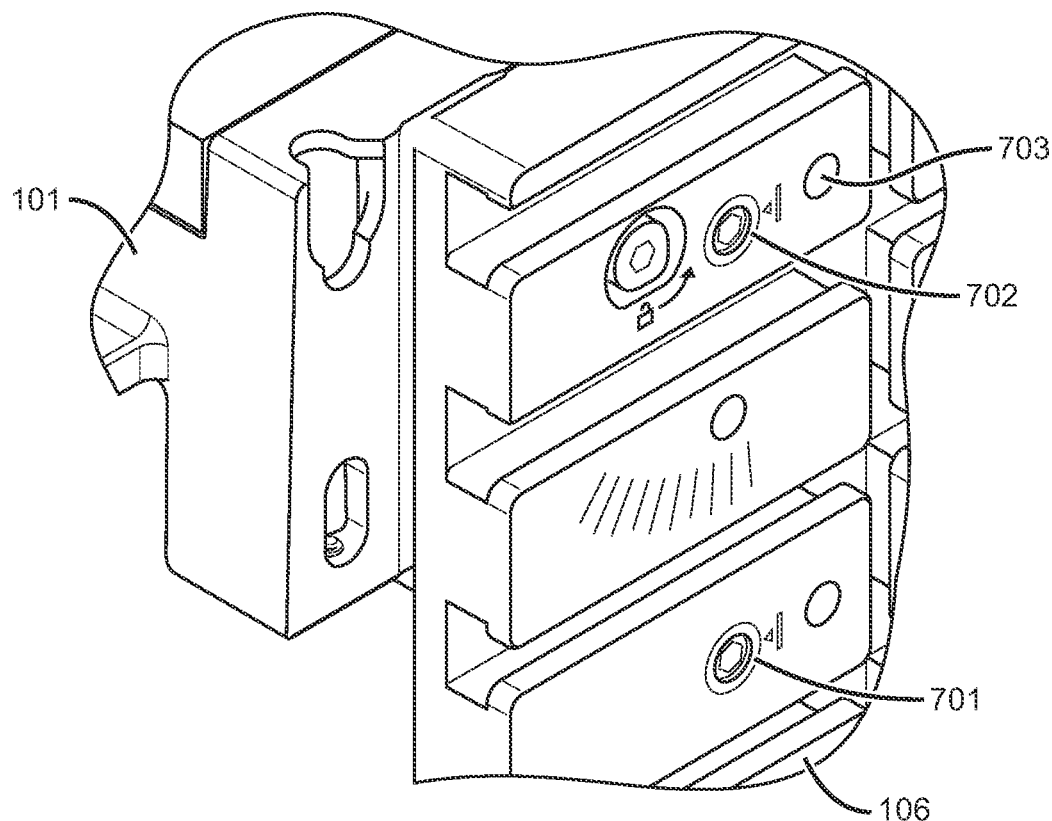
FIG. 7 shows a close-up view of a clamping face including two datum pins.
Figure 8A:
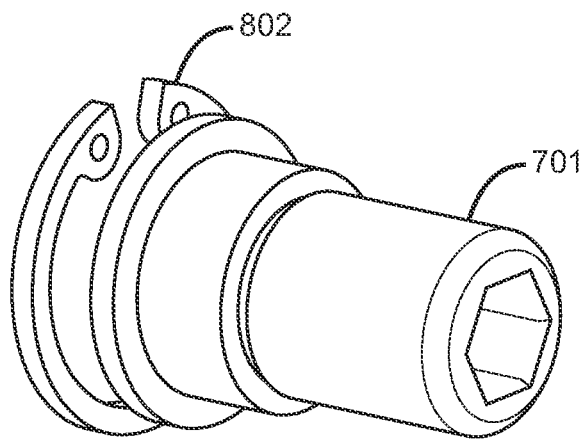
FIG. 8A shows a close-up view of a datum pin.
Figure 8C:
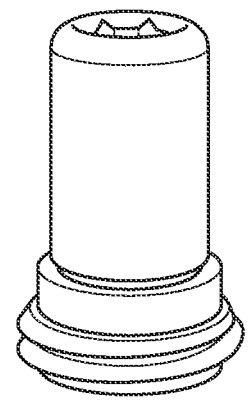
FIG. 8C shows a photograph of a datum pin.
Figure 8B:
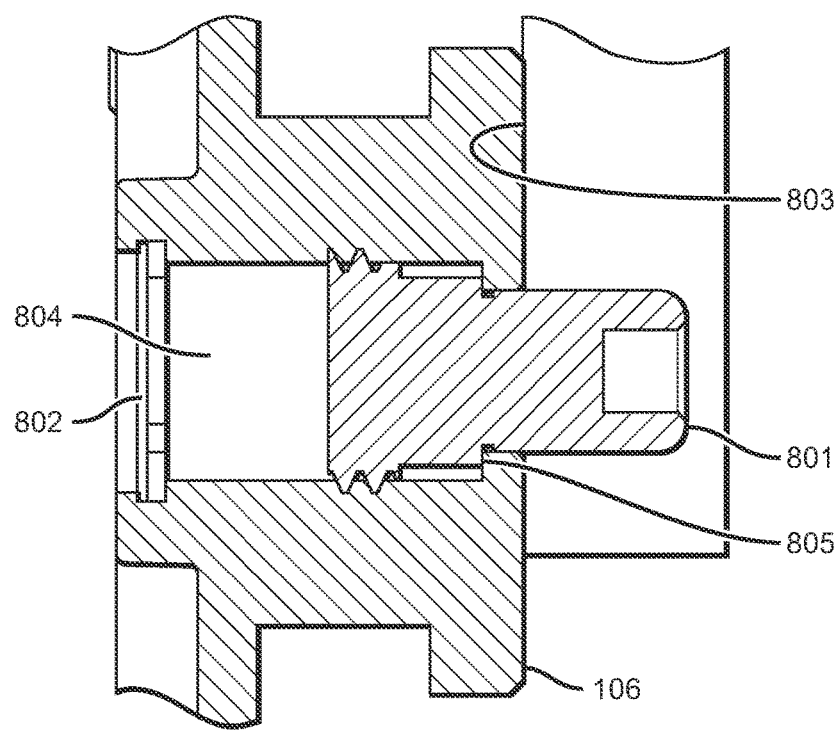
FIG. 8B shows a cross-section view of a datum pin installed on a clamping face.

In some embodiments, the clamping face 106 comprises one or more datum pins. FIG. 7 shows clamping face 106 with datum pins 701 and 702. In some embodiments, a datum pin (e.g., datum pin 701, datum pin 702) may be recessed into the clamping face 106, as shown in FIG. 7. FIG. 8A shows a CAD design rendering of datum pin 701 and retention ring 802. In FIG. 8A, the threaded section of datum pin 701 is rendered incompletely. FIG. 8C shows a photograph of datum pin including the threaded section. In some embodiments, a datum pin 801 may be protruding from the mounting surface 803 as shown in the cross-section view shown in FIG. 8B. In some embodiments, a datum pin may be adjustable such that the datum pin may be configured in the recessed state or the protruded state. For example, as shown in FIG. 8B, the base of the datum pin 801 may be threaded. A channel 804 in the clamping face 106 may also be threaded (not shown) to permit the datum pin 801 to be driven to a recessed or a protruded state by rotating the datum pin 801 relative to the clamping face 106. In some embodiments, a retention ring 802 may be used as a stop to fix the datum pin 801 from recessing too far into channel 804 of the clamping face 106. In some embodiments, the datum pin 801 may have a shoulder 805 used as a stop to fix the distance that the datum pin 801 may protrude from the mounting surface 803. In the Appendix attached below, a datum pin is referred to as a vertical alignment pin. In some embodiments, a portion of a datum pin may have a cylindrical shape (as shown in FIG. 8C). In some embodiments, a portion of a datum pin may have a planar shape (such as a shelf support pin, shelf support spoon). In some embodiments, a datum pin may have a geometry different from the cylindrical geometry shown for the datum pin shown in FIG. 8C.

Figure 13A:
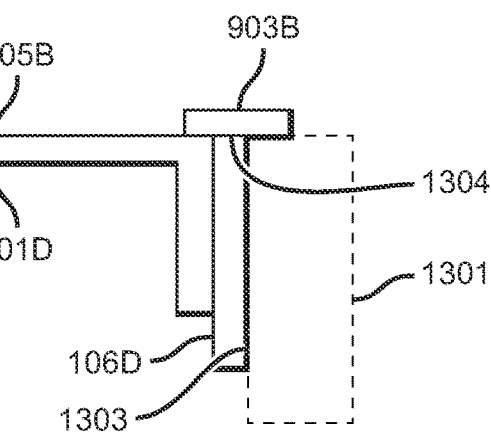
FIGS. 13A and 13B show schematic views of a workstation with a workpiece.
Figure 13B:
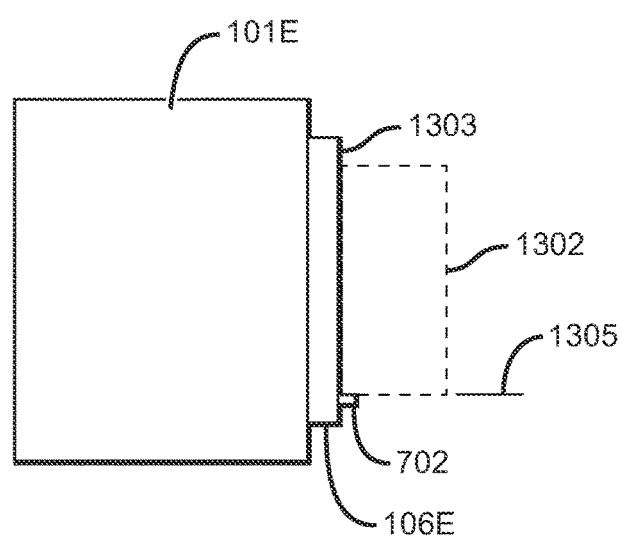

As shown in the schematic top view of FIG. 13B, one or more datum pins (e.g., including datum pin 702A) may be used to define a datum plane 1305. The datum plane 1305 is substantially perpendicular to mounting surface 1303 and references at least one point from each of the one or more datum pins (e.g., including datum pin 702A). In some embodiments, the datum plane may be defined by two datum pins (e.g., datum pins 701 and 702) and a mounting surface, wherein the datum plane is substantially perpendicular to the mounting surface and the datum plane references a point on each of the two datum pins. In some embodiments, a datum plane (e.g., datum plane 1305) is substantially perpendicular to a mounting surface (e.g., mounting surface 1303), the datum plane 1305 is substantially perpendicular to a reference surface (e.g., reference surface 305B in FIG. 13A), and references a datum pin (e.g., datum pin 702A).

As shown in the schematic top view of FIG. 13B, one or more datum pins may be used to reference an edge of workpiece 1302 along a direction (vertical direction in FIG. 13B) relative to the mounting surface 1303 of the clamping face 106E. If workpiece 1302 is removed from the workstation, workpiece 1302 may be placed back at a reference position along a direction (vertical direction in FIG. 13B) by referencing an edge of the workpiece 1302 against the one or more datum pins (e.g., including datum pin 702A). In some embodiments, a component with a planar reference surface (e.g., edge 1606 of angle fence 1602) may be used to define a datum plane or used to reference an edge of workpiece 1302 along a direction (vertical direction in FIG. 13B) relative to the mounting surface 1303 of the clamping face 106E. In some embodiments, a datum pin (e.g., datum pin 701 with a cylindrical shape) may be used along with support bar 903B (as shown in FIG. 13A) to reference an edge of workpiece 1302 along a direction (vertical direction in FIG. 13B) relative to the mounting surface 1303 of the clamping face 106E and to reference another edge of the workpiece against the support bar 903B alignment surface portion 1304.

Figure 9:
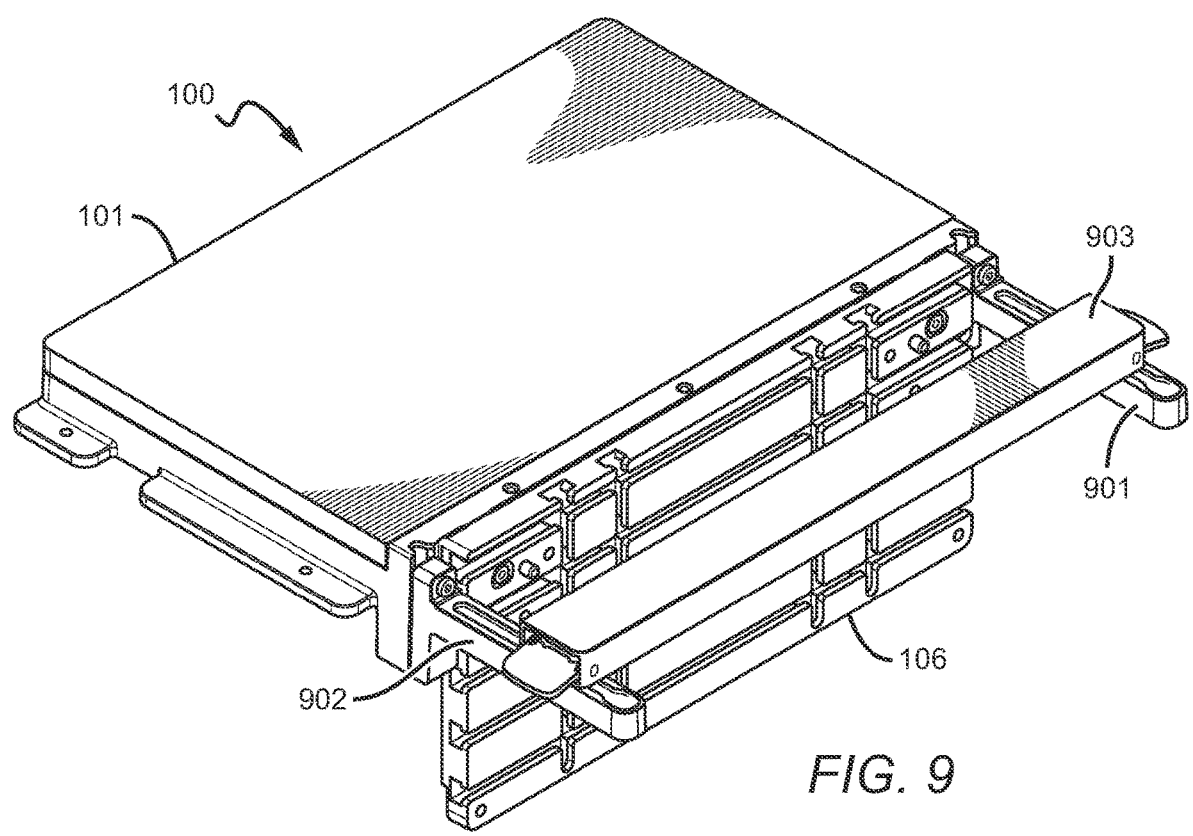
FIG. 9 shows a view of a workstation with support arms and a support bar.
Figure 10:
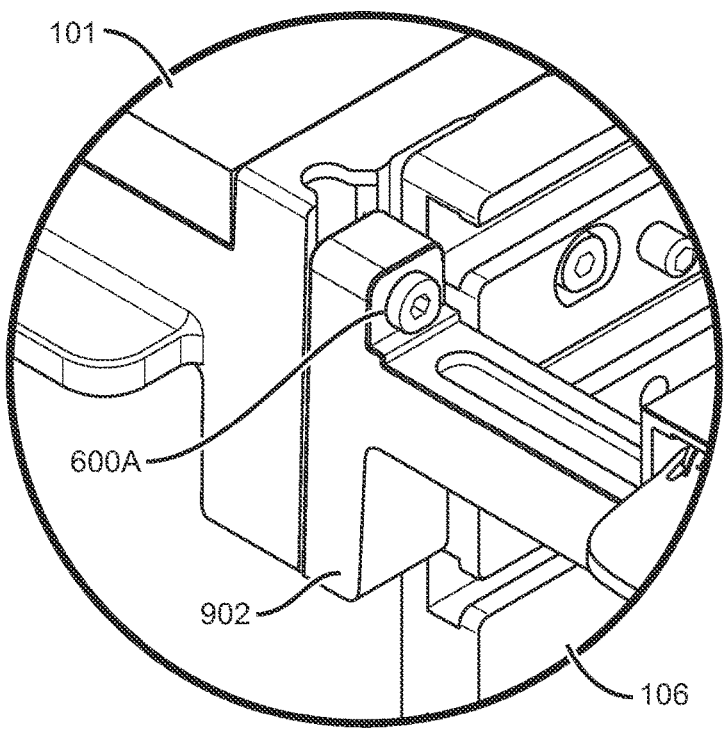
FIG. 10 shows a close-up view of a support arm mounted to a body.
Figure 12A:
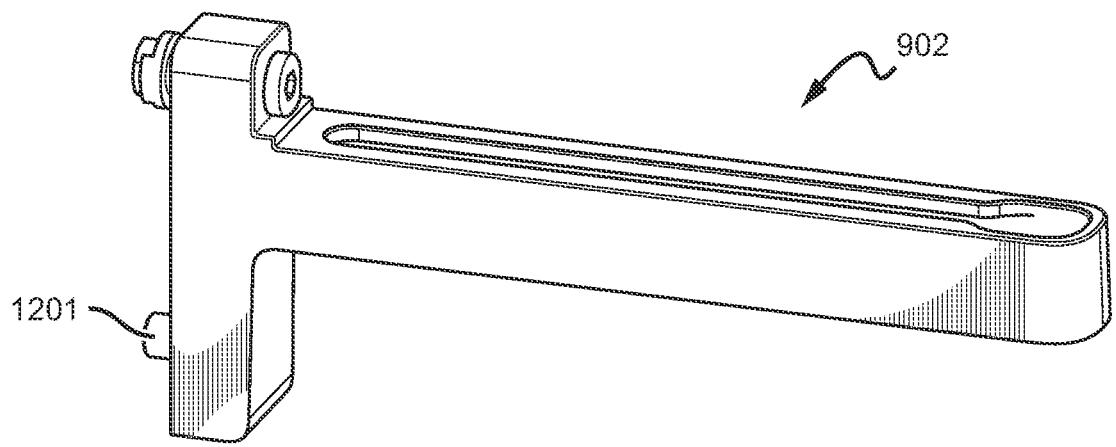
FIGS. 12A and 12C show a support arm.
Figure 12C:
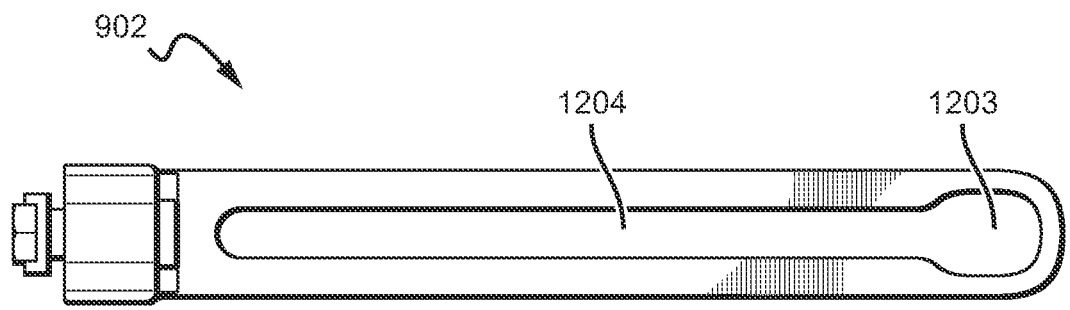
Figure 12B:
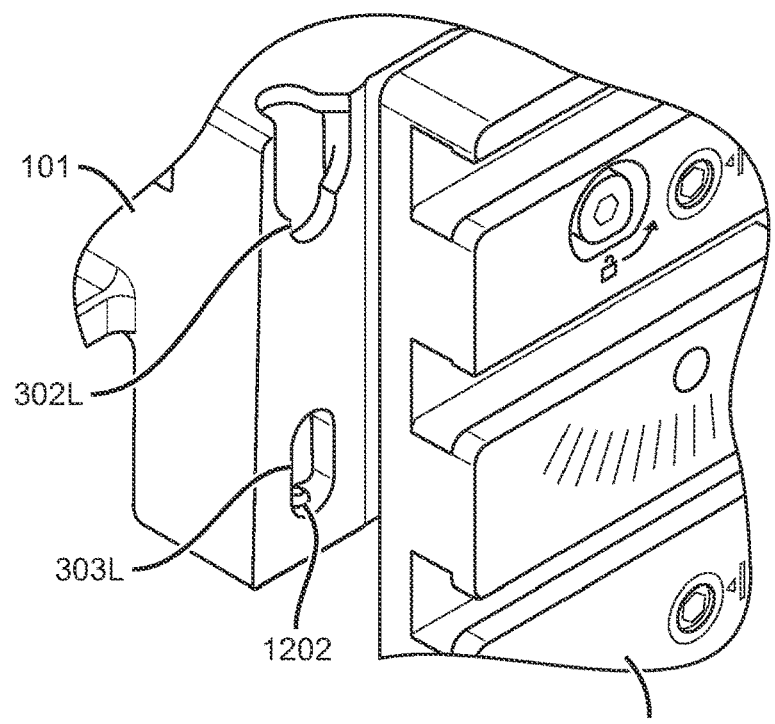
FIG. 12B shows a close-up view of a body.

In some embodiments, as shown in FIG. 9, the workstation 100 may comprise support arms 901 and 902, and support bar 903. In some embodiments, each support arm is coupled to the body. For example, support arm 902 is coupled to the body 101 using one or more mounts (for example, mount 302L in FIGS. 3, 12B). In some embodiments, support arm 902 may be coupled to body 101 using a lock screw 600A as shown in FIG. 10. Lock screw 600A uses mount 302L to couple support arm 902 to body 101. In some embodiments, support arm 902 is coupled to body 101 with less than 3, 2, or 1 turns of the lock screw 600A. In some embodiments, as shown in FIG. 12A, support arm 902 comprises a pin 1201 which may couple with a mount alignment cavity (for example, mount alignment cavity 303L in FIGS. 3, 12B) to set the position and orientation of the support arm 902 relative to the body 101. In some embodiments, the mount alignment cavity may include a guide to set the vertical position of the support arm once the support arm is coupled to the body. For example, as shown in FIG. 12B, mount alignment cavity 303L may include an adjustable set screw 1202 which may be used to set the height of pin 1201 when the support arm 902 is mounted to the body 101 using mount 302L. In some embodiments, mount alignment cavity 303L is designed to accommodate the motion of the pin 1201 (based on the vertical motion of the lock screw 600A in the mount 302L) when attaching the support arm 902 to the body 101.

Figure 11C:
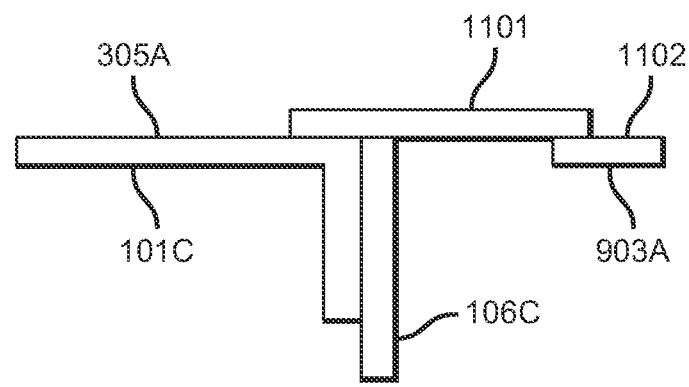
FIG. 11C shows a cross-section view of a tool base on a workstation with a support bar.

In some embodiments, support bar 903 couples to support arms 901 and 902. Support bar may be used to support a tool (e.g., router) while working on a workpiece located between the support bar and the clamping face or the body, as shown in FIG. 11A. In some embodiments, the position of the support bar along the support arms may be adjusted, as shown by the arrows in FIG. 11B, to accommodate workpieces of different sizes. As shown in the schematic cross-section view of FIG. 11C, by adjusting the height and orientation of the support arms (as described above), the support bar 903A may be adjusted such that a support surface portion 1102 (e.g., top surface of support bar 903A) is substantially in the same plane as the reference surface 305A of the body 101C. As used herein, two surfaces are "substantially in the same plane" or two planes are "substantially the same plane" if: (1) the normal vectors of the surfaces/planes are parallel to each other within +/−5 deg, +/−1 deg, +/−0.5 deg, +/−0.2 deg, +/−0.15 deg, or +/−0.1 deg, and (2) there is a first point in the first surface/plane and a second point in the second surface/plane such that the distance between the first point and the second point is less than 100 mil, 50 mil, 20 mil, 10 mil, 5 mil, 3 mil, or 1 mil. FIG. 11C also shows clamping face 106C, and tool base 1101 of a tool (rest of tool not shown) resting on surfaces 305A and 1102. In some embodiments, one or more sensors (e.g., force sensor) may be located on tool base 1101. In some embodiments, a force sensor located on tool base 1101 may be in contact with reference surface 305A or support surface portion 1102 to detect the position of a workpiece relative to the base of the tool as described in U.S. Patent Publication No. 20180126507 (also published as WIPO Publication No. WO 2016/183390), with international filing date of May 12, 2016, incorporated by reference in its entirety.

Figure 14A:
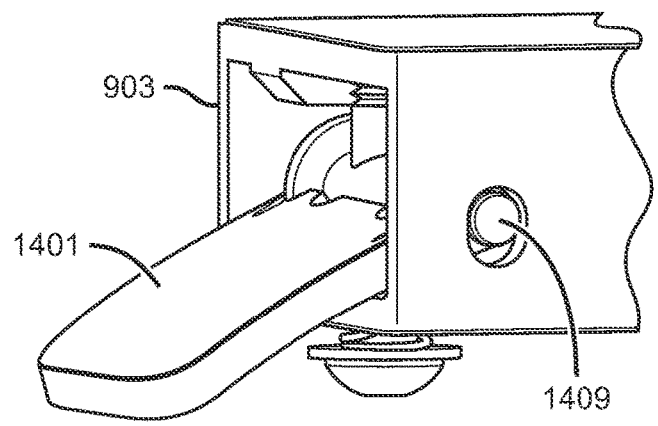
FIGS. 14A and 14B show close-up views of a support bar and components of the support bar.
Figure 14B:
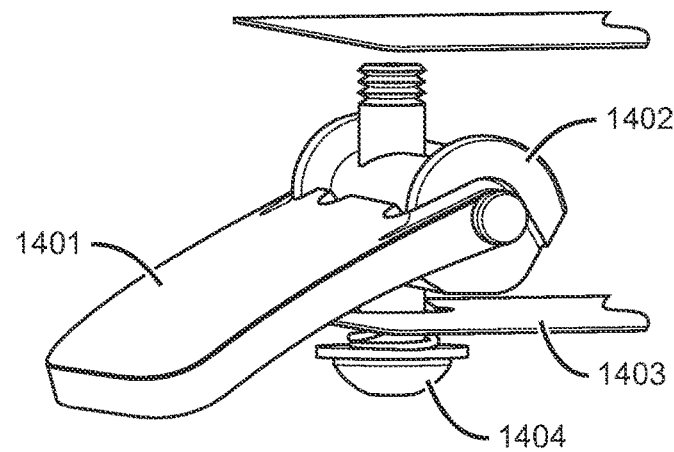
Figure 14C:
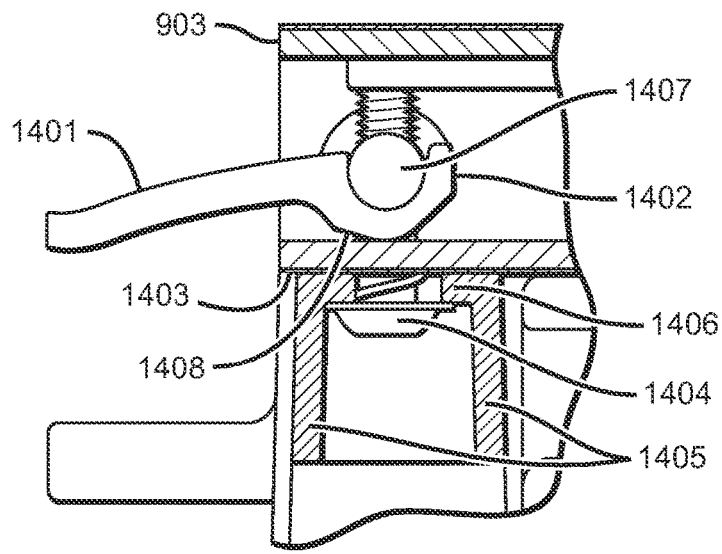
FIG. 14C shows a cross-section view of a support bar mounted to a support arm.

In some embodiments, support bar 903 comprises a handle on each end of the support bar (for example, handle 1401 as shown in FIG. 14A). In some embodiments, as shown in FIG. 14B, the handle 1401 may be used to rotate a cam 1402 to close the gap between a support arm surface 1403 and a fastener 1404 as shown in FIG. 14C. FIG. 14C shows a cross-section view of the support bar 903 coupled to a support arm in cross-section 1405. The fastener 1404 is screwed into a barrel nut 1407. The upward movement of handle 1401 (in FIG. 14C) translates to a clockwise rotation of cam 1402 which, in turn, increases the gap between fastener 1404 and support arm surface 1403. The upward movement of the handle 1401 causes a downward movement of the barrel nut 1407 and fastener 1404. In some embodiments, a portion of the barrel nut 1407 travels in one or more slots 1409 on the support bar 903, see FIGS. 14A, 14B. The downward movement of the handle 1401 (in FIG. 14C) translates to a counter-clockwise rotation of cam 1402 which, in turn, decreases the gap between fastener 1404 and support arm surface 1403—which leads to clamping of the fastener 1404 and support arm surface 1403 against flange 1406 of the support arm 1405 and, thus, securing the support bar 903 to the support arm 1405. In some embodiments, as shown in FIG. 12C, the support arm 902 includes an opening 1203 for the fastener 1404 to fit through. In some embodiments, as shown in FIG. 12C, the support arm 902 includes a channel 1204 with a flange on either side for securing the support bar to the support arm using the fastener as described above. In some embodiments, a flat portion of cam 1408 provides a detent for maintaining the position of the support bar fastener (e.g., maintaining the support bar fastener in the clamped state).

In some embodiments, the body comprises one or more mounts to couple the support bar to the body. For example, in FIG. 3, mount 304L and corresponding mount on the right-hand side (not shown) of body 101 may be used to couple the support bar 903 to the body 101. FIG. 13A shows a schematic cross-section view of support bar 903B coupled to body 101D. Clamping face 106D is also coupled to body 101D. With the support bar 903B coupled to the body 101D, the reference surface 305B of body 101D is substantially in the same plane as the alignment surface portion 1304 of support bar 903B. The support bar configuration illustrated in FIG. 13A is referenced as vertical end stop in the Appendix.

In some embodiments, the configuration of the support bar 903B coupled to the body 101D may be used to reference a workpiece 1301 along a direction (vertical direction in FIG. 13A) by moving an edge of the workpiece 1301 (for example, top surface of workpiece 1301) against the alignment surface portion 1304 in FIG. 13A. In some embodiments, the combination of using one or more datum pins and the alignment surface portion (with the support bar coupled to the body) allows a workpiece to be referenced to the workstation repeatably using 3 planes: (1) a plane defined by the mounting surface 1303, (2) a plane defined by the alignment surface portion 1304, and (3) a datum plane defined by one or more datum pins (not shown). In some embodiments, the combination of using the angle fence 1602 (described below) and the alignment surface portion (with the support bar coupled to the body) allows a workpiece to be referenced to the workstation repeatably using 3 planes: (1) a plane defined by the mounting surface 1303, (2) a plane defined by the alignment surface portion 1304, and (3) a plane defined by edge 1606 of the angle fence 1602.

Figure 15A:
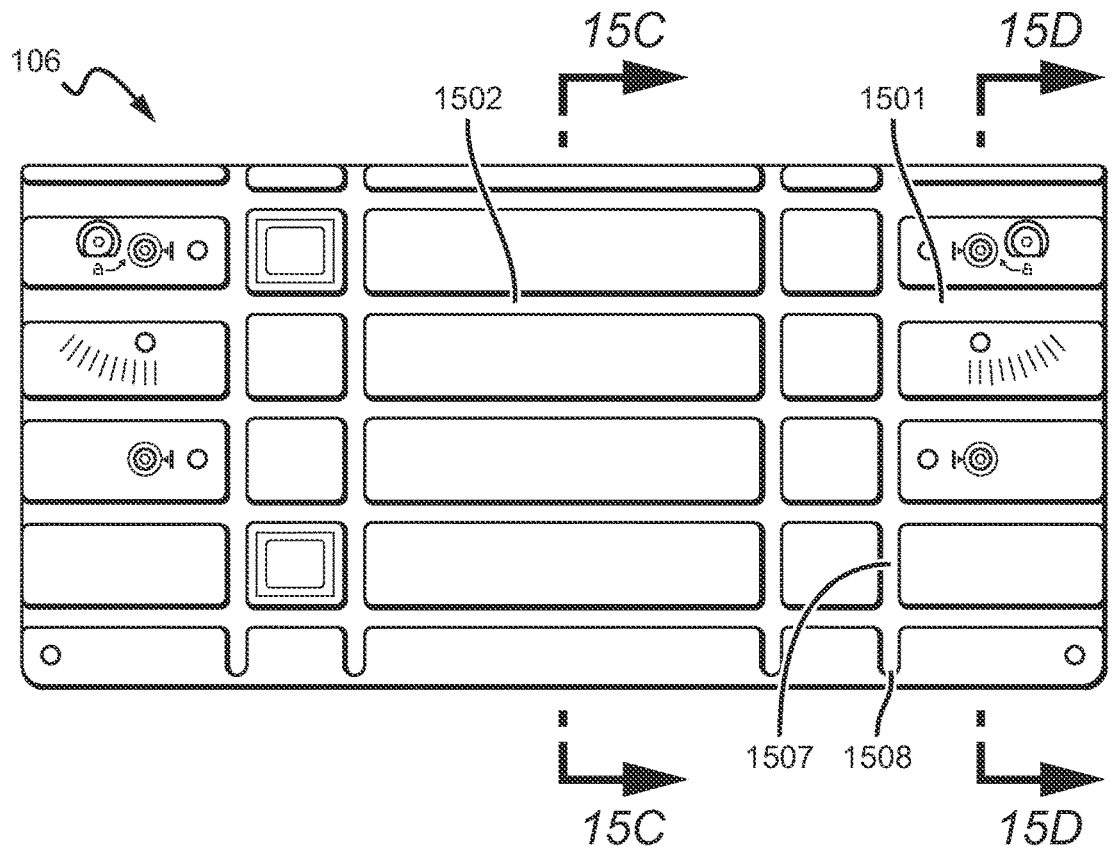
FIGS. 15A and 15B show a view of a clamping face including a mounting surface.
Figure 15B:
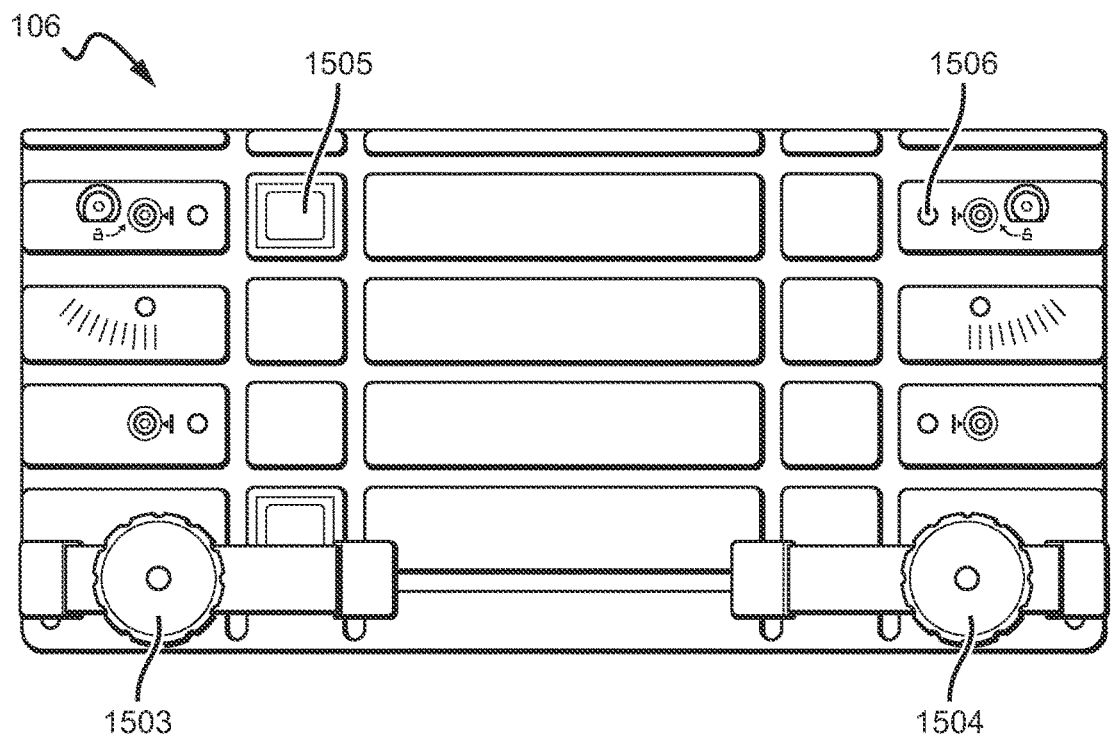
Figure 15C:
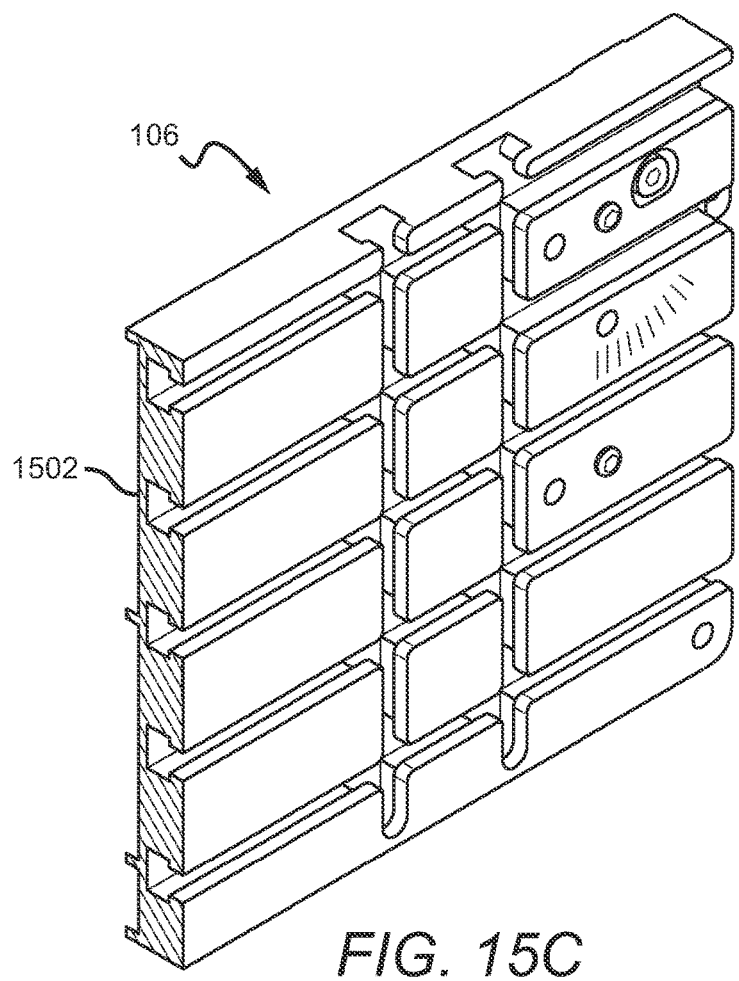
FIGS. 15C and 15D show cross-section views of a clamping face.
Figure 15D:
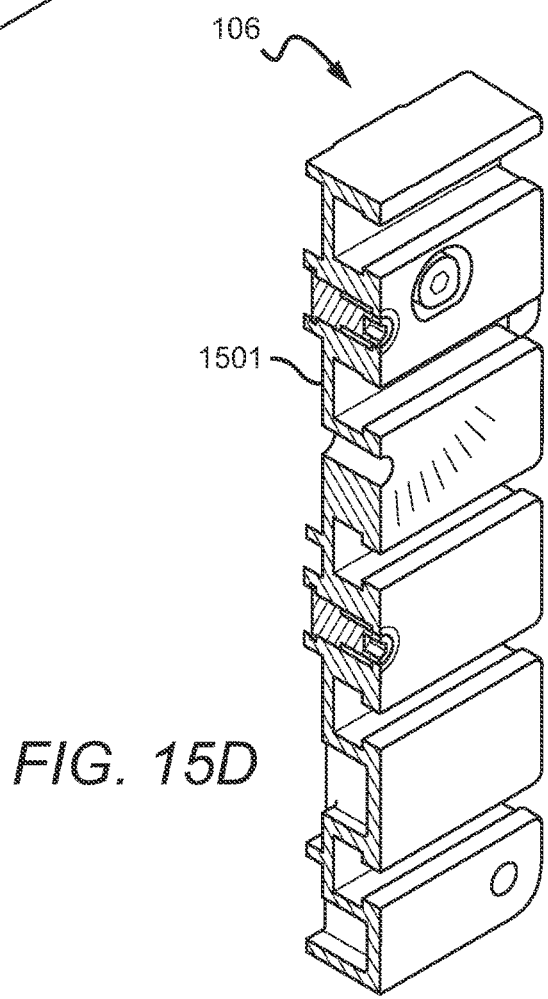

In some embodiments, clamping face 106 comprises one or more slots (e.g., slots 1501 and 1502 in FIG. 15A). In some embodiments, the slots may be used to mount T-nut clamps (e.g., clamps 1503, 1504 in FIG. 15B) on the clamping face 106. In some embodiments, a component of a clamp may be slid into a "T" shape slot from the edge of the clamping face. Clamps 1503 or 1504 may be, for example, a Powertec 71083 Premium Hold-Down Clamp. In some embodiments, the slots may be used to mount an F-style clamp (e.g., Festool 489570 Screw Clamp) on the clamping face 106. In some embodiments, a slot 1501 may have a wider opening than slot 1502 to permit insertion of an F-style clamp or a T-nut clamp from a location not at the edge of the clamping face (compare 1502 in FIG. 15C and 1501 in FIG. 15D). In some embodiments, the slots may be curved or non-rectilinear to enable different clamping geometries. In some embodiments, one or more clamps attached to the clamping face using one or more slots may be used to secure a workpiece (e.g., with a surface of the workpiece against a mounting surface portion of the clamping face) to the clamping face. In some embodiments, a vertical slot 1507 may be closed at the bottom (e.g., at 1508) to prevent components attached to the clamping face using the vertical slot from sliding out of the slot at the bottom. In some embodiments, one or more auxiliary mounting holes (e.g., 703, 1506, 1601) may be included on the clamping face.

Figure 16A:
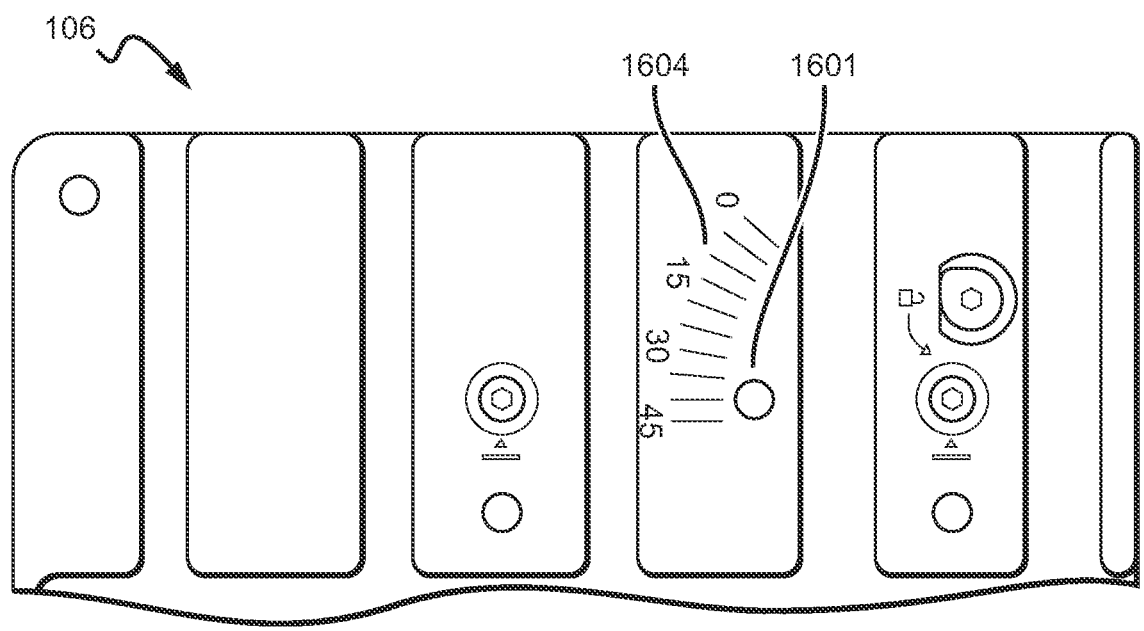
FIGS. 16A and 16B show a close-up view of a clamping face, including an angle fence in FIG. 16B.
Figure 16B:
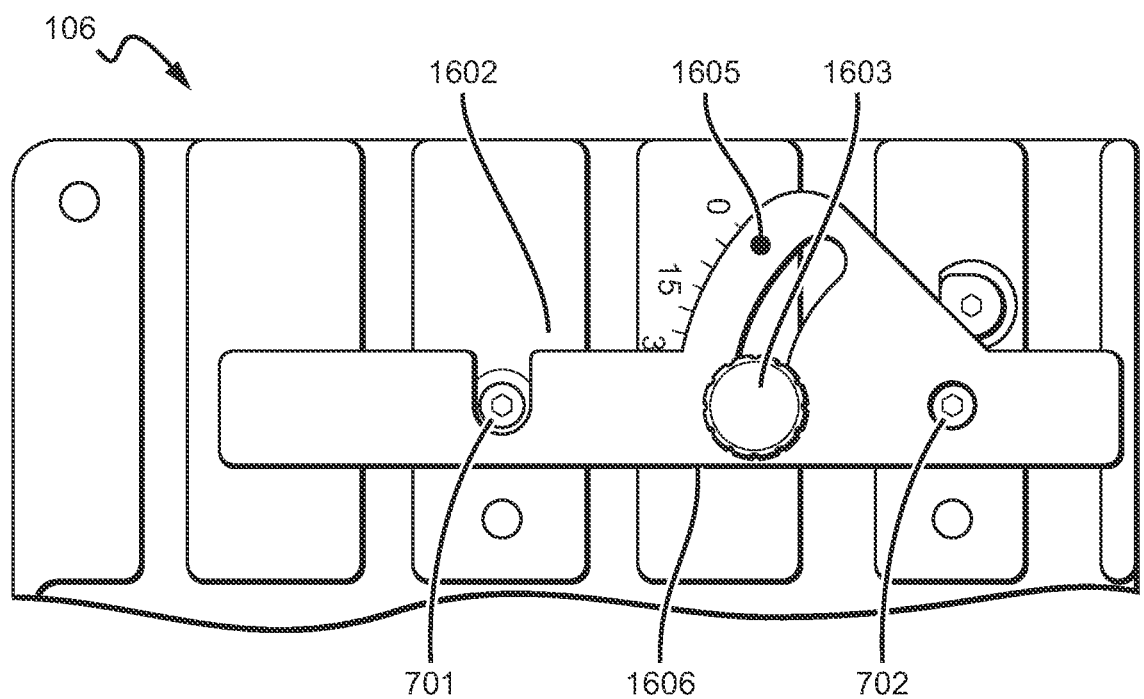

In some embodiments, as shown in FIG. 16B, an angle fence 1602 may be attached to the clamping face 106 using an angle fence thumb screw 1603 (e.g., screwed into auxiliary mounting hole 1601). The angle fence 1602 may be rotated in the plane of the mounting surface (see angle designations 1604 on clamping face 106 in FIG. 16A and angle marker "dot" 1605 on angle fence 1602 in FIG. 16B) to create a reference for an edge of a workpiece to be rotated by a desired angle—along edge 1606. In some embodiments, as shown in FIG. 16B, the angle fence 1602 rotates about datum pin 702, and the "zero" reference angle for the angle fence 1602 corresponds to an edge of the angle fence 1602 resting against datum pin 701. Note, in FIGS. 16A and 16B, the clamping face 106 is shown rotated by 90 degrees relative to the orientation of the clamping face 106 in some of the other figures (e.g., FIGS. 15A, 15B).

Figure 17A:
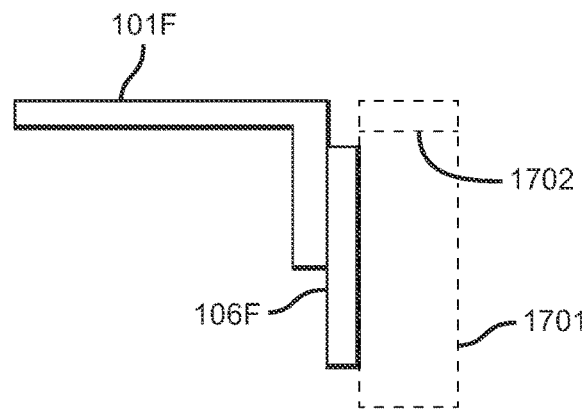
FIGS. 17A and 17B show a cross-section view of a workstation arrangement for using a spoilboard with a workpiece.
Figure 17B:
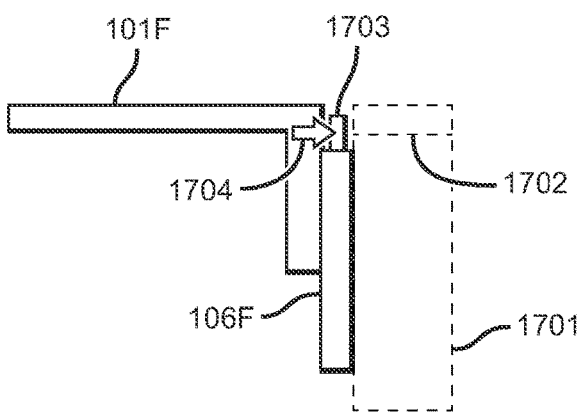
Figure 17C:
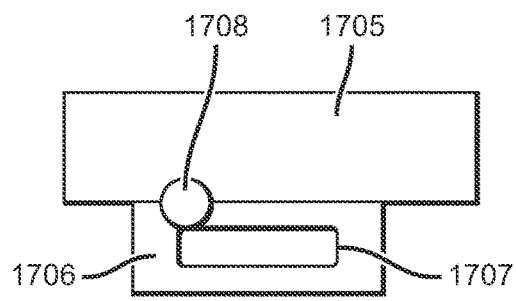
FIG. 17C shows a schematic top view of a workstation with a workpiece.
Figure 17D:
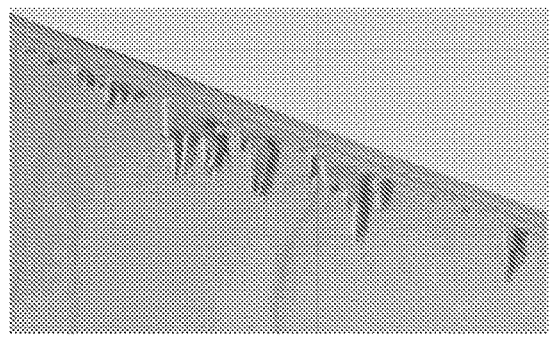
FIG. 17D shows an example of workpiece chipout.

FIG. 17C shows a top-view schematic of a workpiece 1706 mounted to a workstation 1705 (e.g., against a mounting surface of workstation 1705). The schematic shows the layout of cutting a tenon 1707 into the workpiece 1706 using cutting bit 1708. Given the width of the workpiece 1706, the diameter of the cutting bit 1708, and the geometry of the tenon 1707, the schematic illustrates the issue of the cutting bit 1708 cutting into the workstation 1705 if this particular set-up is used to cut the tenon 1707. In order to mitigate cutting into the workstation 1705 in this set-up, one possibility is to introduce a spoilboard between the workpiece 1706 and the workstation 1705. Another advantage of using a spoilboard is that it may help reduce or eliminate chipout, see, for example, FIG. 17D, of the workpiece if the cut edge is not supported.

FIG. 17A shows a schematic cross-section of an arrangement for cutting a workpiece 1701 using a workstation with body 101F and clamping face 106F. If a cut corresponding to dotted line 1702 needs to be made, having the clamping face 106F top surface below the cutting depth mitigates the risk of cutting into the clamping face 106F. However, in this arrangement, there is still risk of chipout due to the fact that the workpiece is unsupported at the cutting edge 1702. In order to mitigate the risk of chipout, as shown in FIG. 17B, a spoilboard 1703 is added and, in some embodiments, the body 101F may comprise one or more protrusions to secure spoilboard 1703 against the workpiece 1701 as indicated by arrow 1704. In some embodiments, the protrusion may include a spring, a set screw, a rotating cam, or the like. In some embodiments, an adjustable protrusion permits the use of different thickness spoilboard. In some embodiments, a clamping face may have a cut out (e.g., 1505 in FIG. 15B) to accommodate a protrusion in one or more coupling configurations.

Figure 18A:
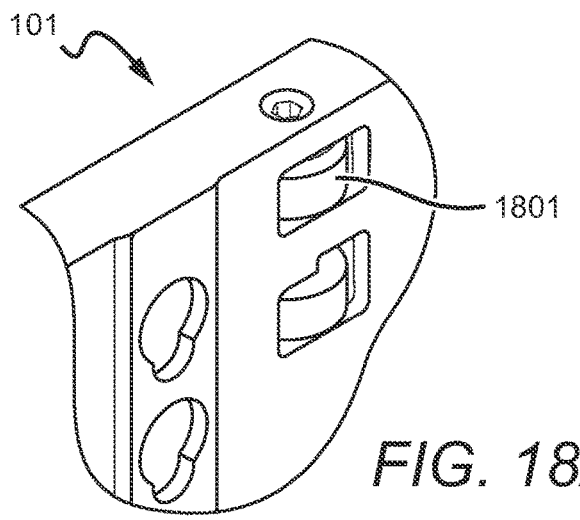
FIGS. 18A-C show views of a cam protrusion for use with a workstation.
Figure 18B:
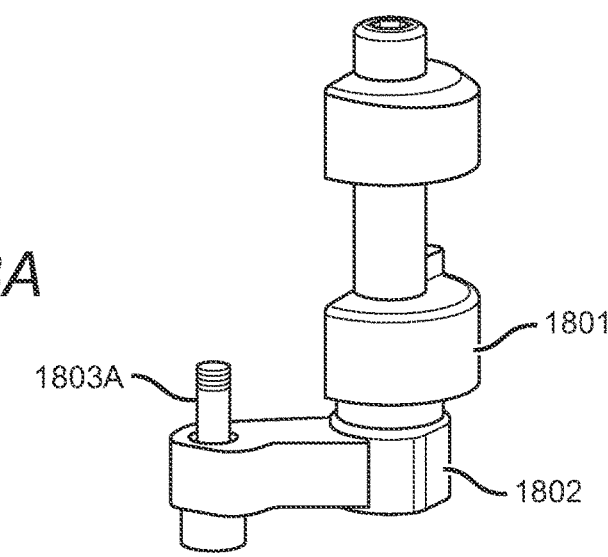
Figure 18C:
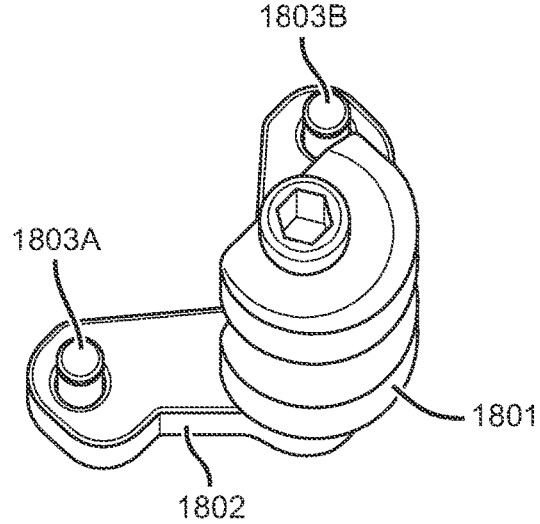
Figure 18D:
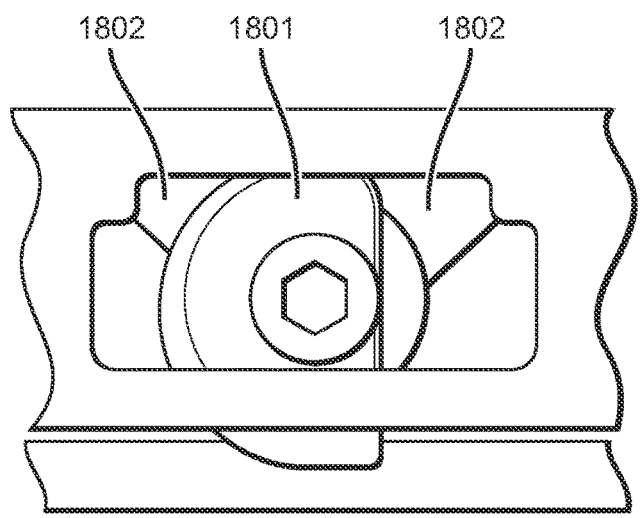
FIG. 18D shows a cross-section top view of a cam protrusion installed on a body.

FIG. 18A shows an embodiment of a protrusion for use in securing a spoilboard against a workpiece. FIG. 18A shows an installed-view of a cam-type protrusion 1801 mounted in body 101. FIG. 18B shows the cam-type protrusion 1801, mounting bracket 1802, and fastener 1803A for securing the mounting bracket 1802 to the body 101. FIG. 18C shows a different view of the cam-type protrusion 1801, mounting bracket 1802, fastener 1803A, and fastener 1803B (also for securing the mounting bracket 1802 to the body 101). The design of the cam-type protrusion 1801 allows an adjustable amount of the cam to extend beyond the surface of the body 101 as the cam-type protrusion 1801 is rotated in mounting bracket 1802 using the hex nut at the top of the cam-type protrusion 1801. In some embodiments, mounting bracket 1802 may include an o-ring to apply a tension on the cam-type protrusion 1801 to help maintain a given position. FIG. 18D shows a cut-away, top view of the cam-type protrusion 1801 and mounting bracket 1802 installed in body 101. In some embodiments, a protrusion to secure a spoilboard against a workpiece may extend 5 mm, 4 mm, 3 mm, 2 mm, or 1 mm from the surface of the body. In some embodiments, a protrusion may be adjustable to extend past a surface of the body by a distance up to 5 mm, 4 mm, 3 mm, 2 mm, or 1 mm. FIG. 18D shows a configuration with the most protrusion for the given cam-type protrusion 1801. Less protrusion may be provided by rotating the hex nut at the top of the cam-type protrusion 1801 counterclockwise in FIG. 18D.

Figure 19A:
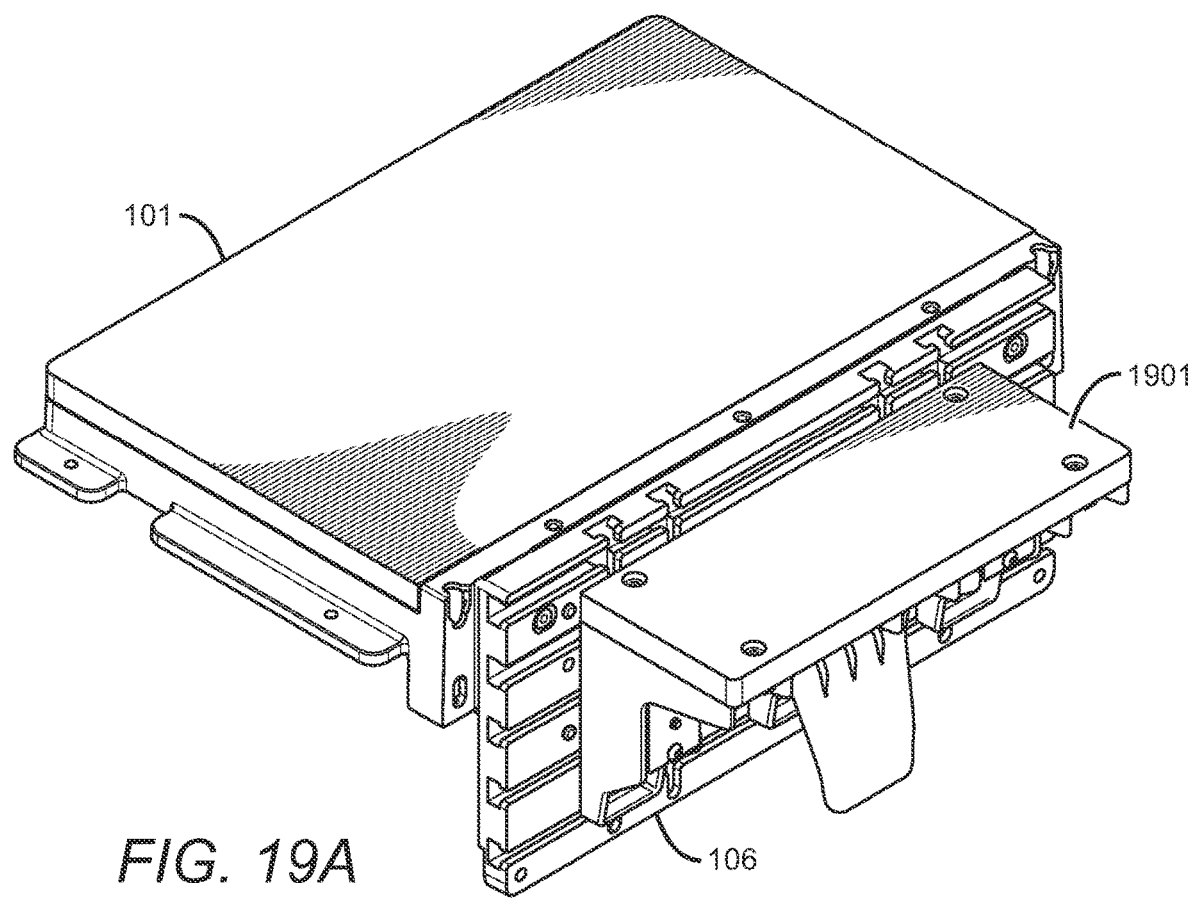
FIG. 19A shows a shelf installed on a clamping face of a workstation.
Figure 19B:
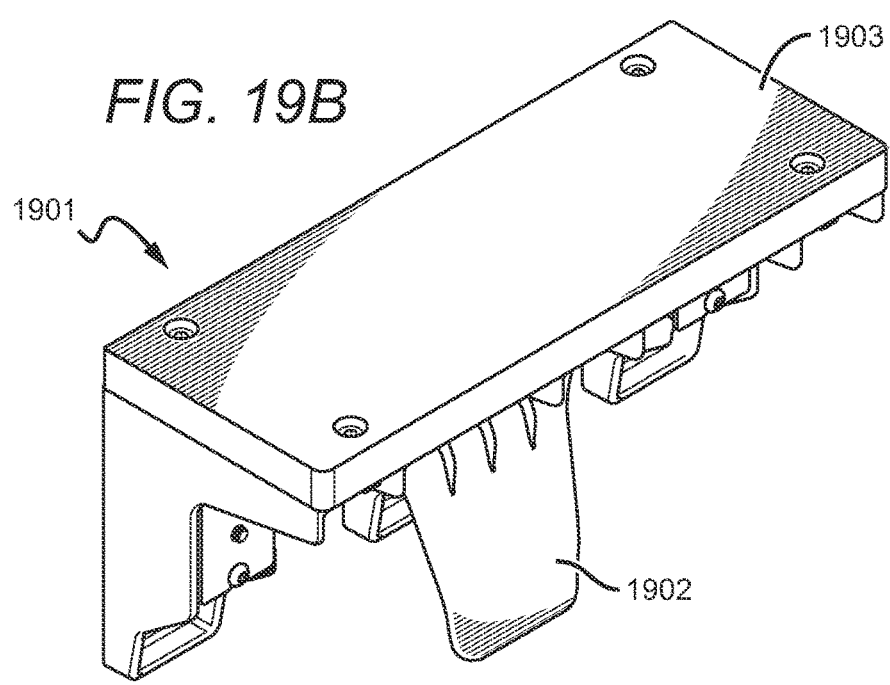
FIG. 19B shows a front side view of a shelf.
Figure 19C:
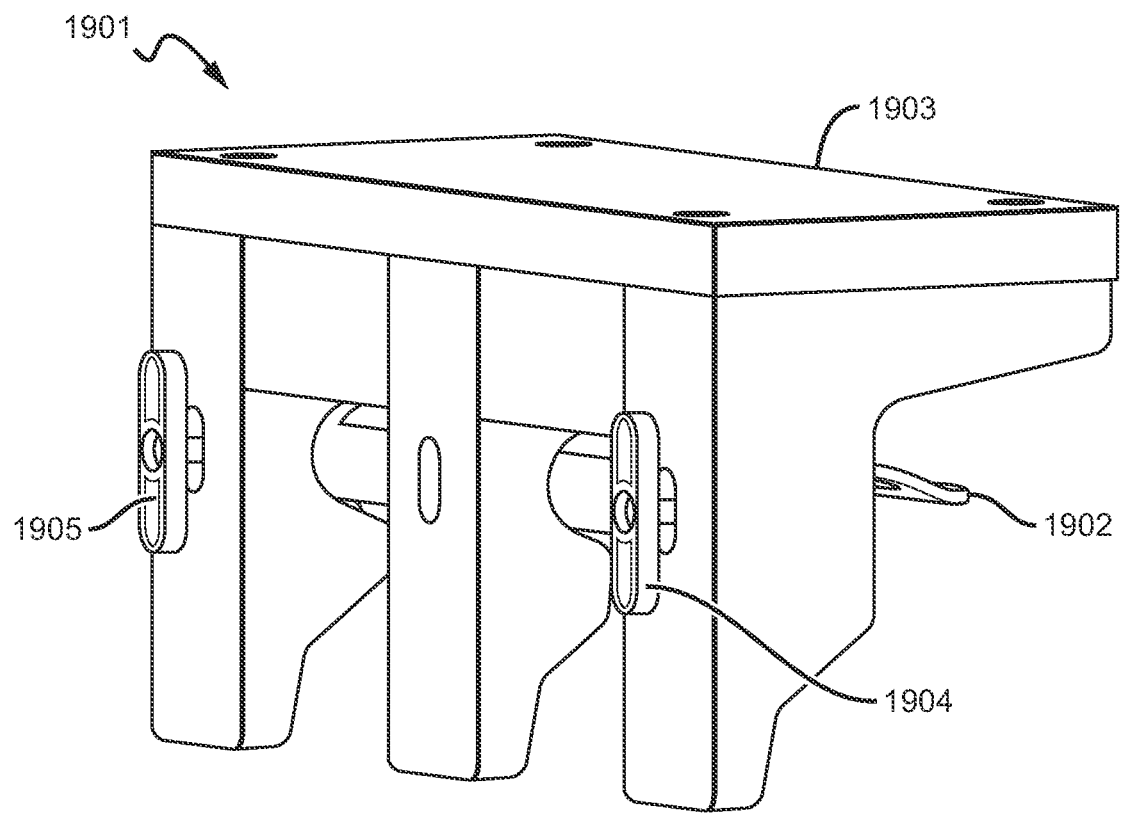
FIG. 19C shows a rear side view of a shelf.
Figure 19D:
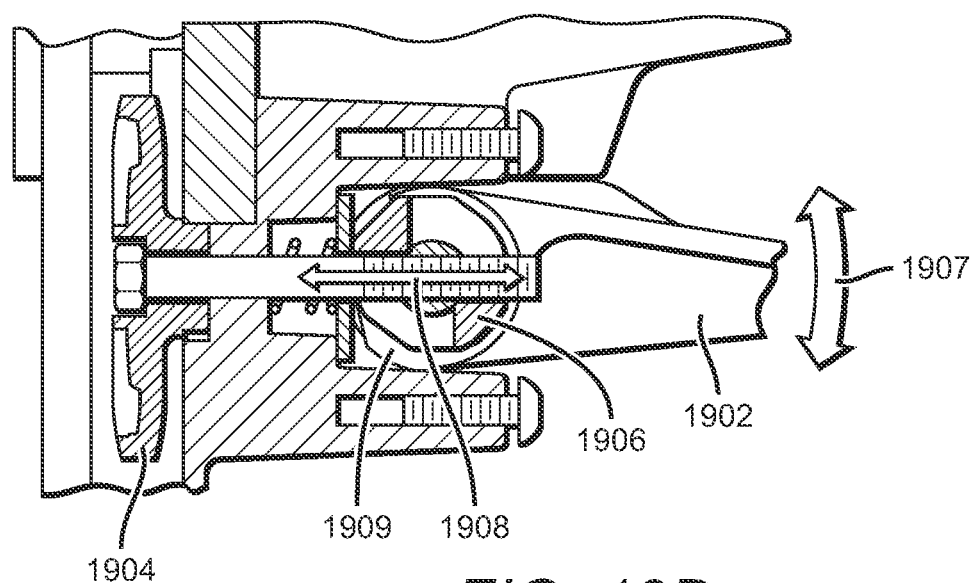
FIG. 19D shows a cross-section view of a cam and a handle of a shelf.

In some embodiments, a shelf 1901 may be coupled to the clamping face 106 as shown in FIG. 19A. In some embodiments, the shelf 1901 comprises an adjustment handle 1902 and shelf top 1903 as shown in FIG. 19B. As shown in FIG. 19C, in some embodiments, the shelf 1901 is coupled to the clamping face 106 using a cam 1906 to clamp a first foot 1904 and a second foot 1905 against one or more slots of the clamping face. In some embodiments, as shown in FIG. 19D, the cam 1906 is coupled to the adjustment handle 1902 to adjust the gap between the feet 1904 and 1905 and a flange of the one or more slots of the clamping face. In some embodiments, the shelf cam has three states: (1) fully unlocked state for installation of shelf into slot on clamping face and for rough adjusting the position of the shelf on the clamping face after installation, (2) in-friction state so that the shelf stays in the position set by the user (when released) but still allows fine adjustment of the shelf position (e.g., to level workpiece to the reference surface plane), and (3) clamped state to fix position of the shelf relative to the clamping face. In some embodiments, the shelf cam is adjusted into the three states by rotating the adjustment handle as indicated by arrow 1907 to move the cam along a direction indicated by arrow 1908. In some embodiments, a flat portion of cam 1909 provides a detent for maintaining the position of the adjustment handle (e.g., maintaining the shelf in the clamped state).

Figure 20:
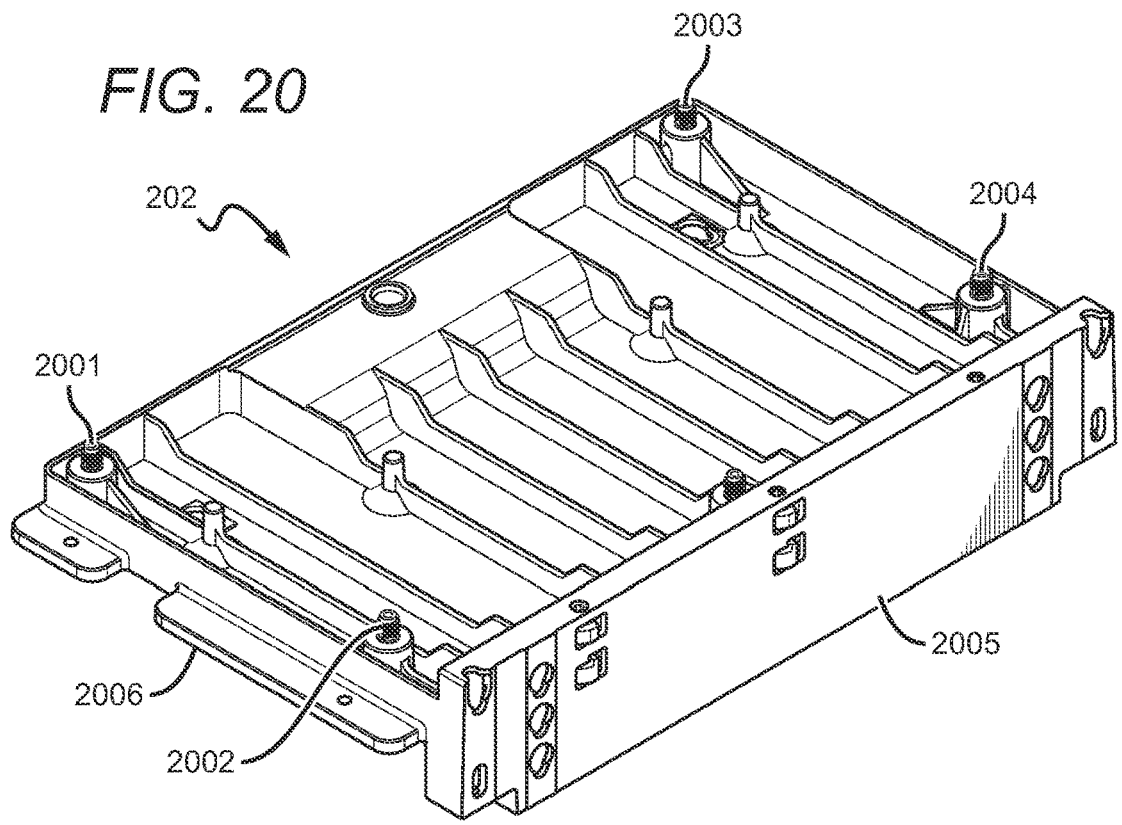
FIG. 20 shows a view of a body base of a workstation.

In some embodiments, the body top 201 is secured to the body base 202 at one or more locations. As shown in FIG. 20, in some embodiments, body base 202 may include fastening locations 2001, 2002, 2003, and 2004 to secure the body top 201 (not shown) to the body base 202. In some embodiments, one or more shims may be placed at one or more of the fastening locations to adjust the position or orientation of the body top relative to the body base (e.g., relative to body base front surface 2005 or body base workbench contact surface 2006). In some embodiments, the use of shims to adjust the position or orientation of the body top may increase manufacturing yield by adjusting the reference surface orientation with respect to the orientation of the mounting surface of the clamping face.

In some embodiments, a computer-controlled tool may use positional information related to a feature of the workstation (e.g., position and orientation of one or more markers relative to the workstation, position and orientation of two non-parallel edges of the workstation, position and orientation of a corner of the workstation, position and orientation of a logo etched into the workstation) along with information related to the workstation geometry (e.g., design dimensions of one or more workstation components, CAD design of the workstation) to trigger one or more tool related actions. In some embodiments, a computer-controlled tool determines the position of the feature of the workstation. In some embodiments, using the information related to the workstation geometry along with the position of the feature of the workstation, the computer-controlled tool determines the position of other features of the workstation. After determining the position of the other features of the workstation, the computer-controlled tool may take one or more actions based on the position of one or more tool components relative to the position of one or more features of the workstation.

For example, if the computer-controlled tool detects that the cutting bit installed on the tool is nearing a component of the workstation (e.g., workstation body, workstation support arm, workstation support bar) during a cutting task, the tool may retract the cutting bit into the tool, move the cutting bit away from the component of the workstation, stop the motor spinning the cutting bit, provide an audible alert to the tool's user, or provide a visual alert on a display coupled to the tool for the user to see. In some embodiments, a tool is adapted to receive a component for performing a task. For example, a tool may comprise a chuck adapted to receive a cutting bit.

In some embodiments, the positional information related to a feature of the workstation and the information related to the workstation geometry may be provided to the end user of the workstation (e.g., included with the workstation on a non-transitory computer readable medium (e.g., USB drive, optical CD or DVD or Blu-ray disc), made available for download (e.g., using a unique ID for the workstation, using a workstation model number)). In some embodiments, the positional information related to a feature of the workstation may be measured for each workstation. In some embodiments, the positional information related to a feature of the workstation may be associated with a unique ID for the workstation.

In some embodiments, the computer-controlled tool may receive the positional information related to a feature of the workstation based on an image of the feature of the workstation taken with a camera coupled to the computer associated with the tool, and the computer-controlled tool may receive the information related to the workstation geometry (including, e.g., CAD information for the design of the workstation). In some embodiments, the computer-controlled tool may receive the positional information related to a feature of the workstation and the information related to the workstation geometry based on an image that includes the feature of the workstation and some portion of the workstation structure—in this case, the computer associated with the tool may use computer vision techniques to determine the design dimensions of the workstation from the image.

Figure 21:
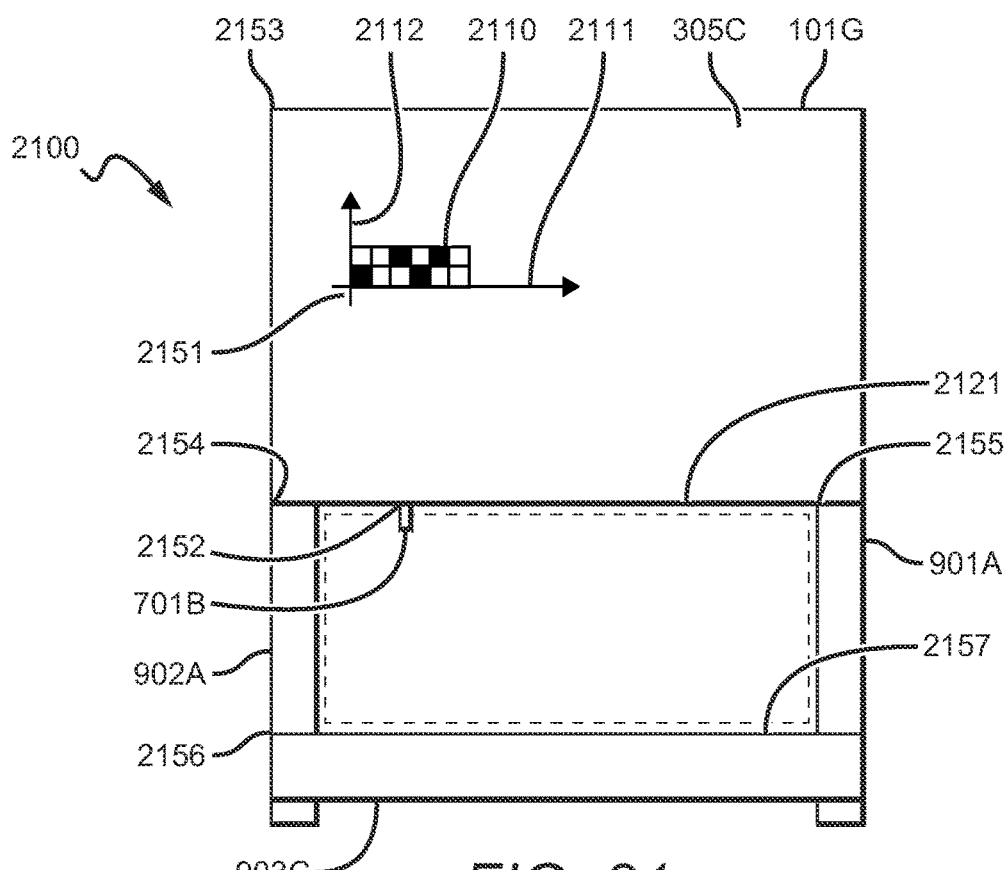
FIG. 21 shows a schematic top view of a marker on a workstation with support arms.

FIG. 21 shows an exemplary schematic layout of workstation 2100 including body 101G, right support arm 901A, left support arm 902A, support bar 903C, datum pin 701B, and a feature (e.g., marker 2110) on reference surface 305C. In some embodiments, marker 2110 may be encoded with machine readable data (e.g., bar code or QR code with a marker ID). In some embodiments, a marker-based coordinate system with origin 2151 located at the bottom left corner of marker 2110 with x-axis defined along dotted arrow 2111, y-axis defined along dotted arrow 2112, and z-axis defined directed up out of the figure (not shown) may be defined relative to marker 2110. Additionally, based on the workstation geometry and specifications related to the placement of the feature on the workstation (e.g., positioning of marker 2110 on workstation 2100 body 101G), information related to the workstation geometry may include coordinate locations (in the marker-based coordinate system) of: (1) the upper left corner 2153 of body 101G, (2) upper left corner 2154 of left support arm 902A, (3) left corner 2152 of datum pin 701B, upper left corner 2155 of right support arm 901A, and upper left corner 2156 of support bar 903C (and dimensions of one or more of body 101G, right support arm 901A, left support arm 902A, and datum pin 701B).

In some embodiments, a tool camera (e.g., 2816) coupled to a tool computer system (for example, computer system 2500 in FIG. 25) may capture an image of marker 2110 on the workstation 2100. In some embodiments, using the captured image and computer vision techniques (e.g., image-based localization, localization based on solving the perspective-n-point problem), the tool computer system may define a tool-based coordinate system including the position and orientation of marker 2110. In some embodiments, using the workstation geometry information along with the positional information related to marker, the tool computer system may determine the position of one or more workstation components in the tool-based coordinate system. In some embodiments, using tool geometry information (e.g., position and orientation offset information between the tool camera and a cutting bit installed in the tool), the tool computer system may determine the position of one or more tool components (e.g., tool camera, tool cutting bit) in the tool-based coordinate system. In some embodiments, the tool computer system may determine the positional information related to the marker, workstation components, or tool components in the marker-based coordinate system or any other suitable coordinate system. In some embodiments, the tool computer system may determine positional information related to one or more components in different coordinate systems.

In some embodiments, the tool computer system may utilize the positional information related to a tool component (e.g., cutting bit) and the positional information related to a workstation component (e.g., positional information related to bottom edge 2121 of body 101G) to trigger one or more actions. For example, if the tool is a computer-controlled, guided router as described in FIGS. 28A-D, the tool computer system may retract the cutting bit (so that the cutting bit does not extend beyond the base of the tool) if the cutting bit is within 1", 0.5", 0.25", or 0.125" of the workstation bottom edge 2121. This action may be performed to prevent the cutting bit from cutting into a component (e.g., body) of the workstation. In some embodiments, the action may be triggered by measuring the distance between a tool component and a component of the workstation—e.g., triggering action if the distance between the components is less than 1", 0.5", 0.25", or 0.125". This example illustrates an action based on the direct relative distance between the tool component and the component of the workstation. In some embodiments, the action may be triggered by determining that a component of the tool is entering a zone based on the tool component's position in a first coordinate system, wherein the location of the zone (in the first coordinate system) is determined based on the workstation component geometry in the first coordinate system and the buffer size of 1", 0.5", 0.25", or 0.125". This example illustrates an action based on the indirect relative distance (e.g., using an inference of relative proximity between the tool component and the workstation component via the calculated zone) between the tool component and the component of the workstation. In some embodiments, a zone may be determined using a portion of a component. For example, a zone for a body of a workstation may be defined using an edge or a surface of the body (e.g., surface 307).

In some embodiments, with the tool computer system (e.g., tool 2800) controlling the motion of the cutting bit (e.g., relative to the tool base housing 2801) to keep the cutting bit on a desired path, the tool computer system may trigger an action based on a prediction of the tool (e.g., tool base housing) motion relative to an exclusion zone. For example, in some embodiments, the tool computer system may predict that the cutting bit may encounter an exclusion zone at a future time (e.g., 500 ms, 200 ms, 100 ms, 50 ms, 20 ms or less) if the tool base housing continues its current motion (e.g., using one or more of the tool base housing position, speed, acceleration, or the like) and trigger an action (e.g., retract the cutting bit out of the material, move the cutting bit above the tool base housing) based on the prediction. For example, in some embodiments, the tool computer system may predict the motion of the cutting bit relative to an exclusion zone at a future time (e.g., 500 ms, 200 ms, 100 ms, 50 ms, 20 ms or less) based on one or more of: the current motion of the cutting bit (e.g., relative to the tool base housing), the current motion of the tool base housing (e.g., relative to the workstation), and the desired path that is being followed by the tool computer system. In some embodiments, based on a prediction at a future time (e.g., in 50 ms), an action may be triggered with a larger distance between the cutting bit and an exclusion zone if the cutting bit is moving quickly towards the exclusion zone, and an action may be triggered with a smaller distance between the cutting bit and the exclusion zone if the cutting bit is moving slowly towards the exclusion zone.

In some embodiments, the tool computer system may define a set of one or more zones (e.g., an exclusion zone, an activity zone) that trigger an action if a tool component enters the zone. In some embodiments, an exclusion zone is a zone in which a component of the tool is excluded (e.g., to prevent damage to other components). In some embodiments, an activity zone is a zone in which a tool component is allowed to perform a task (e.g., cutting, drawing). For example, an activity zone may include the zone defined by the dotted rectangle 2157 formed by edge 2121 of the body 101G, the edge of the support arms 901A and 902A, and the edge of the support bar 903C in FIG. 21. In some embodiments, a zone may be defined by growing the space occupied by a workstation component (e.g., in the marker-based coordinate system, in the tool-based coordinate system) by a buffer distance of 1", 0.5", 0.25", or 0.125". Then, an action may be triggered by the tool computer system if a tool component (e.g., cutting bit) enters a zone. In some embodiments, one or more zones may be defined in a 2-dimensional plane of the coordinate system being used by the tool computer system to track interactions between the tool components and the workstation components (see, for example, FIGS. 23A, 23B). In some embodiments, one or more zones may be defined using the 3-dimensional space of the coordinate system being used by the tool computer system for tracking interactions between the tool components and the workstation components. In some embodiments, a zone may include a probing zone, wherein the probing zone may be used to determine: (1) a position of a cutting bit tip relative to a base of a tool, (2) a lateral position of a cutting bit relative to a feature of a tool, or (3) a position of a workpiece relative to a feature of a tool or a workstation—as described in U.S. Patent Publication No. 20190196438.

In some embodiments, a user may identify workstation components that are used to define a zone. In some embodiments, if the user is using left support arm 902A, the user may indicate that left support arm 902A is installed on the workstation 2100 using a menu in the user interface of the tool computer system. In some embodiments, if the user is not using right support arm 901A, the user may indicate that the right support arm 901A is not installed on workstation 2100 using a menu in the user interface of the tool computer system. In some embodiments, the tool computer system may detect which components of the workstation are installed using a camera coupled to the tool computer system along with computer-vision based object identification software (using, for example, the shape or geometry of the workstation components and computer vision algorithms related to object recognition or structure from motion). In some embodiments, the tool computer system may detect which components of the workstation are installed using a camera coupled to the tool computer system to detect one or more machine readable markers (e.g., marker 2110, bar code, QR code) on the installed components. In some embodiments, a marker on a support bar or a feature of the support bar may be used by a tool computer system to detect the support bar position relative to a body of a workstation (e.g., for use in defining a zone, such as zone 2157 in FIG. 21).

In some embodiments, different configurations of the workstation may have different exclusion zones. For example, if the clamping face 106H is in the coupling configuration shown in FIG. 23A, a representation of horizontal exclusion zone 2303 (dashed line) for a cutting bit 2302 of a tool (with tool base 2301) resting on body 101A may include the horizontal space occupied by clamping face 106H. However, if the clamping face 106J is in the coupling configuration shown in FIG. 23B, a representation of the horizontal exclusion zone 2306 (dashed line) for a cutting bit 2305 of a tool (with tool base 2304) resting on body 101J may exclude the horizontal space occupied by clamping face 106J if the cutting bit 2305 does not extend down to the top of clamping face 106J. In some embodiments, a computer-controlled tool may modify an exclusion zone (e.g., changing zone size, zone shape, zone position, zone orientation) based on a change in the configuration of the workstation (e.g., a change in the workstation configuration from that shown in FIG. 23A to the configuration shown in FIG. 23B, or vice versa).

In some embodiments, a user's command (e.g., to plunge a spinning cutting bit past the base of the tool) may be overridden (e.g., not executed) if the execution of the command would result in a portion of tool component (e.g., outer edge of the cutting bit (e.g., based on the diameter or radius of the cutting bit), cutting bit tip) entering a defined exclusion zone (e.g., body 101G of workstation 2100). In some embodiments, another portion of the tool component (e.g., side of the cutting bit) may be used to trigger an action (e.g., stop the motor spinning the cutting bit) if the component enters the exclusion zone (e.g., if the cutting bit 2305 enters exclusion zone 2306 in FIG. 23B).

In some embodiments, a coordinate system generated by the tool using one or more features of the workstation may be used to register a design plan relative to one or more features of the workstation, wherein the design plan includes information related to the pattern to be used to perform a task (e.g., cutting) on a workpiece. For example, a design plan may be registered at a coordinate location and an orientation relative to 3 reference planes associated with the workstation: (1) a plane defined by the mounting surface 1303, (2) a plane defined by the alignment surface portion 1304, and (3) a datum plane defined by one or more datum pins (not shown), see FIGS. 13A, 13B.

In some embodiments, with the design plan registered relative to these 3 reference planes and a workpiece referenced to the workstation using the 3 reference planes, the user may take a workpiece that has been partially cut using the design plan off of the workstation and return the workpiece back onto the workstation using the 3 reference planes associated with the workstation to continue cutting the design plan without needing to realign the workpiece to the workstation. In some embodiments, with the design plan registered relative to these 3 reference planes, a user may place a workpiece on the workstation referencing one or more of the 3 reference planes and start cutting a pattern (from the design plan) on the workpiece without needing to determine the position of the workpiece relative to the workstation or the design plan. Particularly, the registration of the design plan to the 3 reference planes of the workstation permits positioning of the design plan relative to a workpiece if the workpiece references one or more of the 3 reference planes of the workstation. In some embodiments, the position of four surfaces of a rectangular workpiece may be determined relative to the workstation by referencing two of the workpiece surfaces against 2 of the 3 reference planes and probing the position of the remaining two surfaces of the workpiece—e.g., using a computer-controlled router as described in U.S. Patent Publication No. 20190196438.

FIGS. 28A-28D are diagrams illustrating a computer-controlled router (e.g., controlled by computer system 2500) as system 2800 in accordance with an embodiment. Table 1 lists the components of the system 2800 illustrated in FIGS. 28A-D. In some embodiments, system 2800 may include one or more communication interfaces (e.g., WiFi, Bluetooth, Ethernet) to permit communication with other computers systems via a network (e.g., to send and receive fabrication data (for example, information regarding cuts made on a working surface), to send and receive design plans).

TABLE 1

List of components of tool and reference numbers illustrated in FIGS. 28A-28D.

| Reference # | Description |
| --- | --- |
| 2801 | Base Housing |
| 2802 | Touchscreen Display |
| 2803 | Structural Enclosure |
| 2804 | Electronics Compartment Cover |
| 2805 | Motor Shroud |
| 2806 | Finger Guard and Vacuum Hood |
| 2807 | Vacuum Port |
| 2808 | Left Handle |
| 2809 | Left Handle Button |
| 2810 | Right Handle |
| 2811 | Right Handle Button |
| 2812 | Lift Handle |
| 2813 | USB Port |
| 2814 | Removable Chip Tray |
| 2815 | Workpiece Illumination LEDs |
| 2816 | Camera |
| 2817 | Chip Clearance Area |
| 2818 | Spindle Motor |
| 2819 | Magnetic Latch |
| 2820 | Carriage and Spindle Motor Clamp |

TABLE 1-continued

List of components of tool and reference numbers illustrated in FIGS. 28A-28D.

| Reference # | Description |
| --- | --- |
| 2821 | Tool Aperture |
| 2822 | Stage |

Figure 28A:
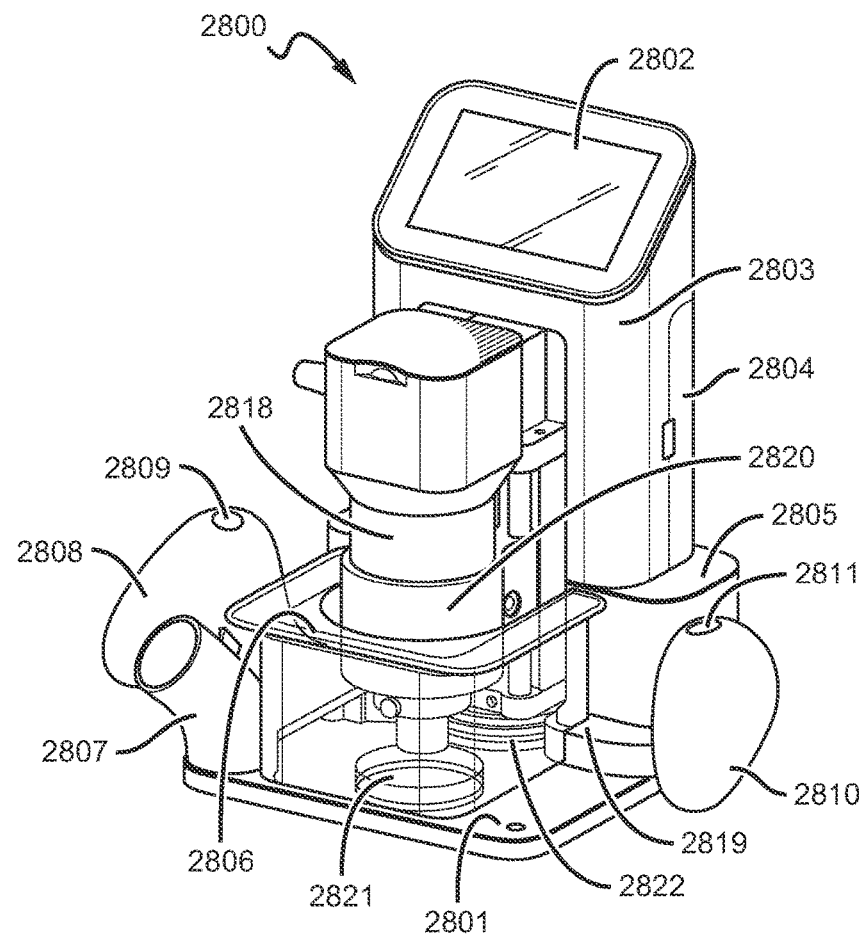
FIGS. 28A-D show views of an exemplary tool for use with a workstation.
Figure 28B:
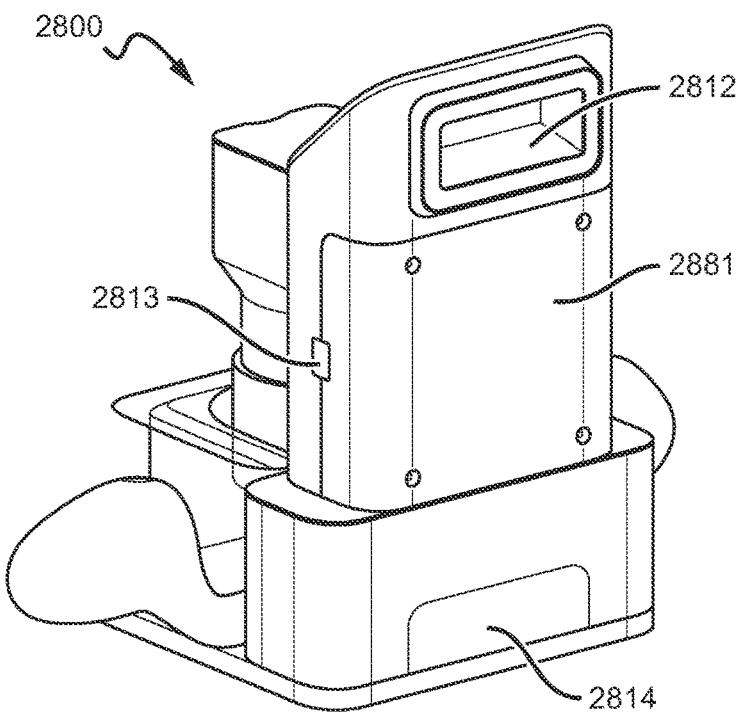
Figure 28C:
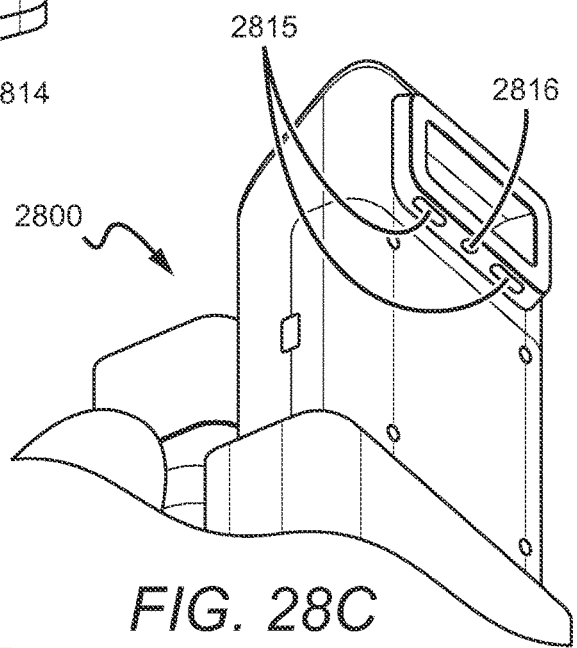
Figure 28D:
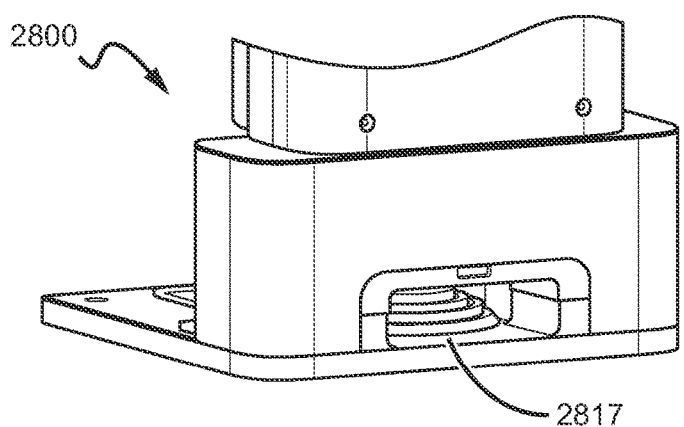

FIG. 28A illustrates a router, comprised of elements including an actuator-controlled stage 2822 which moves clamp 2820 in the X, Y, and Z directions under control of a computer system (e.g., computer system 2500). In some embodiments, during use, a cutting bit coupled to the spindle motor 2818 is controlled in X, Y, and Z to perform a task on a workpiece through the tool aperture 2821. The spindle motor 2818 can be affixed to the carriage by a circumferential clamping force in clamp 2820. This arrangement can allow the clamp to accommodate manufacturing variation in the diameter of the spindle motor. The router can include a finger guard and dust shroud 2806 which may be retained by magnetic latches 2819; handles 2808 and 2810 with control buttons 2809 and 2811 that allow the user to interact with the code running on one or more processors; a vacuum port 2807 for interfacing with dust extractor hoses; a touchscreen display 2802 which allows the user to interact with code running on one or more processors; a structural tower 2803 which also houses the electronics (e.g., computer system 2500); an electronics cover 2804; a shroud 2805 for protecting internal components including motors (e.g., to position stage 2822 in X, Y, and Z); and a base housing 2801. Dust shroud 2806 and vacuum port 2807 can be shaped to improve the capture of cutting debris as well as direct the cutting debris from the tool aperture 2821, where the cutting debris is generated by the cutting tool, toward the vacuum port 2807.

In some embodiments, one or both handles (e.g., 2808, 2810) of system 2800 may include one or more of: a control button (e.g., 2809, 2811), a scroll wheel, a multi-stage button, an indicator LED, a D-pad, a joystick, a touchpad, a grip sensor, a trigger, a biometric (e.g., fingerprint, iris, facial recognition) sensor, or other input device. For example, the right handle may have two control buttons and three indicator LEDs, and the left handle may have a touchpad and a scroll wheel. In some embodiments, a control button may be, based on the current state of system 2800 (e.g., design plan selection mode, design plan registration mode, cutting mode), programmed to do one or more of the following: turn on the working action of the working member (e.g., turn on the spindle motor 2818 if the system 2800 is in the cutting mode, lower a drawing instrument to contact the working surface if system 2800 is a drawing tool), turn off the working action of the working member (e.g., turn off the spindle motor 2818), toggle the working action of the working member on and off, plunge the working member into the working surface, or retract the working member from the working surface. In some embodiments, the working member may be a cutting bit or a drawing instrument (e.g., a pen). In some embodiments, a scroll wheel may be, based on the current state of system 2800, programmed to do one or more of the following: change the rate of working action of the working member (e.g., change the speed of the spindle motor 2818 in system 2800), change the content shown on a display connected to system 2800 (e.g., change the magnification of the view shown on the touchscreen display 2802 in system 2800, change the location of displayed data in an ARD or VRD connected to system 2800), scroll through a menu in the UI shown on a display connected to system 2800 (e.g., if the system 2800 is in the design plan selection mode), or change the z-position of the working member. In some embodiments, an indicator LED may indicate one or more of: working member power state (e.g., red for spindle motor 2818 on and green for spindle motor 2818 off), rate of working action of the working member (e.g., change from green to yellow to red for spindle motor 2818 speed varying from off to low to high), or working member state (e.g., green for retracted from and red for plunged into working surface). In some embodiments, a D-pad, a joystick, or a touchpad may be, based on the current state of system 2800, programmed to do one or more of the following: navigate in the UI shown on a display connected to system 2800, move the working member within the adjustment range of system 2800, or extend or retract the working member from the working surface. In some embodiments, a grip sensor may detect the pattern of the user's grip on the handle or the pressure of the user's grip on the handle. In some embodiments, a grip sensor may use one or more optical, force, capacitance, resistance, pressure, or any other sensing mechanism to detect the user's grip. In some embodiments, a depressible trigger-type input device on a handle may be used to control the rate of working action of the working member (e.g., control spindle motor 2818 motor speed). In some embodiments, a biometric sensor (e.g., on a handle, on the tool body) may restrict usage or restrict functionality available to one or more users (e.g., users registered on the tool, users registered on a computer system managing user access to the tool).

In some embodiments, the system 2800 may be programmed to confirm that each of the user's hands are gripping both grip sensors (one on each handle) prior to enabling a functionality of the tool (e.g., prior to turning on the spindle motor 2818). In some embodiments, the handles may be shaped differently for working on different working surfaces (e.g., having one handle design when the system 2800 used to work on a horizontal surface and having another, different handle design when the system 2800 is used to work on a vertical surface).

In some embodiments, the system 2800 may be designed to permit swapping of the handles to permit additional or different functionality. In some embodiments, the system 2800 may have electrical (e.g., using connectors on a PCB) and mechanical interfaces designed to connect with different handles. In some embodiments, the system 2800 may communicate with a handle using I2C, USB, Bluetooth, or other communication protocol. In some embodiments, the handles may be mechanically attached to the tool using mounting holes in base housing 2801. In some embodiments, a handle may be hot-swappable (e.g., can be connected or disconnected from the system 2800 while the system 2800 is powered on). In some embodiments, one or more processors may execute instructions stored on one or more memories to cause the system 2800 to permit or disable functionality related to one or more input devices on a handle or to cause the system 2800 to permit or disable functionality by detecting capability included on a connected handle. In some embodiments, one or more processors on system 2800 may load software onto additional processors located in an interchangeable handle to change or upgrade the functionality of the handle.

In some embodiments, a finger guard and dust shroud 2806 may mechanically trigger one or more switches (e.g., hall effect switch, reed switch) to detect removal or improper positioning of the finger guard and dust shroud 2806. In some embodiments, a status of one or more switches detects the positioning of a finger guard and dust shroud 2806. In some embodiments, a status of one or more switches may be used to enable or disable one or more functionalities of the system 2800. In some embodiments, a finger guard and dust shroud 2806 may trip one or more switches to denote new functionality (e.g., fan, camera, vent hole) related to the finger guard and dust shroud 2806.

Figure 25:
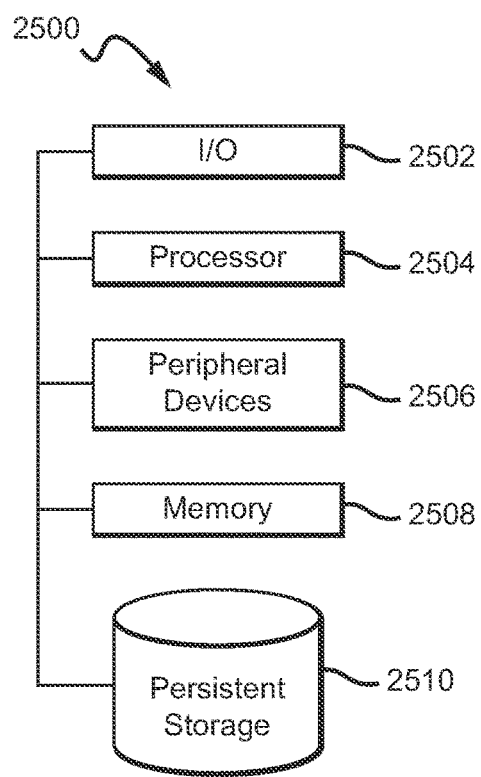
FIG. 25 is an exemplary computer system for use in an embodiment.

FIG. 25 illustrates an example of a computer system 2500 that may be used to execute program code stored in a non-transitory computer readable medium (e.g., memory) in accordance with embodiments of the disclosure. The computer system includes an input/output subsystem 2502, which may be used to interface with human users or other computer systems depending upon the application. The I/O subsystem 2502 may include, e.g., a keyboard, mouse, graphical user interface, touchscreen, or other interfaces for input, and, e.g., a LED or other flat screen display, or other interfaces for output, including application program interfaces (APIs). Other elements of embodiments of the disclosure, such as the controller, may be implemented with a computer system like that of computer system 2500.

Program code may be stored in non-transitory media such as persistent storage in secondary memory 2510 or main memory 2508 or both. Main memory 2508 may include volatile memory such as random-access memory (RAM) or non-volatile memory such as read only memory (ROM), as well as different levels of cache memory for faster access to instructions and data. Secondary memory may include persistent storage such as solid-state drives, hard disk drives or optical disks. One or more processors 2504 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 2504. The processor(s) 2504 may include graphics processing units (GPUs) for handling computationally intensive tasks.

The processor(s) 2504 may communicate with external networks via one or more communications interfaces, such as a network interface card, WiFi transceiver, etc. A bus 805 communicatively couples the I/O subsystem 2502, the processor(s) 2504, peripheral devices 2506, communications interfaces, memory 2508, and persistent storage 2510. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 2500. In particular, the elements of automated systems or devices described herein may be computer-implemented. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references cited herein, including, without limitation, articles, publications, patents, patent publications, and patent applications, are incorporated by reference in their entireties for all purposes, except that any portion of any such reference is not incorporated by reference herein if it: (1) is inconsistent with embodiments of the disclosure expressly described herein; (2) limits the scope of any embodiments described herein; or (3) limits the scope of any terms of any claims recited herein. Mention of any reference, article, publication, patent, patent publication, or patent application cited herein is not, and should not be taken as an acknowledgment or any form of suggestion that it constitutes valid prior art or forms part of the common general knowledge in any country in the world, or that it discloses essential matter.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the claims.

In the claims below, a claim n reciting "any one of the preceding claims starting with claim x," shall refer to any one of the claims starting with claim x and ending with the immediately preceding claim (claim n−1). For example, claim 18 reciting "The system of any one of the preceding claims starting with claim 11" refers to the system of any one of claims 11-17.

EMBODIMENTS

1. A workstation, comprising:
   a body, wherein the body comprises a reference surface, and the reference surface comprises one or more reference surface portions; and
   a clamping face, wherein, in a first state, the clamping face is removably coupled to the body, the clamping face comprises a mounting surface, the mounting surface comprises one or more mounting surface portions, and, with the clamping face coupled to the body in a first coupling configuration, each reference surface portion is substantially perpendicular to each mounting surface portion.
2. The workstation of embodiment 1, wherein, with the clamping face coupled to the body in a second coupling configuration different from the first coupling configuration, each reference surface portion is substantially perpendicular to each mounting surface portion.
3. The workstation of embodiment 2, wherein the position or orientation of the clamping face, relative to the body, in the first coupling configuration corresponds to a translation or rotation of the position or orientation of the clamping face, relative to the body, in the second coupling configuration.
4. The workstation of any one of the preceding embodiments, wherein the body comprises a set of one or more mounts for each coupling configuration of the body and the clamping face, and, in each coupling configuration, the body and the clamping face are coupled using the corresponding set of mounts.
5. The workstation of embodiment 4, further comprising:
   one or more lock screws to couple the body and the clamping face in one or more coupling configurations, wherein each lock screw couples the body and the clamping face using a corresponding mount of the set of mounts.
6. The workstation of embodiment 5, wherein each lock screw secures the coupling of the body and the clamping face in less than one full turn.
7. The workstation of any one of the preceding embodiments, wherein the clamping face comprises a first datum pin.
8. The workstation of embodiment 7, wherein the clamping face comprises a second datum pin, and the second datum pin is different from the first datum pin.
9. The workstation of any one of embodiments 7 or 8, wherein a datum plane is defined based at least in part upon the first datum pin, wherein the datum plane is substantially perpendicular to each of the mounting surface portions.
10. The workstation of any one of embodiments 7-9, wherein, with the first datum pin in a second state, the first datum pin protrudes past a first mounting surface portion of the one or more mounting surface portions, and, with the first datum pin in a third state, the first datum pin is recessed with respect to the first mounting surface portion.
11. The workstation of embodiment 10, wherein, with the second datum pin in a fourth state, the second datum pin protrudes past a second mounting surface portion of the one or more mounting surface portions, and, with the second datum pin in a fifth state, the second datum pin is recessed with respect to the second mounting surface portion
12. The workstation of any one of embodiments 9-11, wherein the body comprises a first set of one or more mounts such that a first datum plane is defined with the body and the clamping face in the first coupling configuration using the first set mounts, the body comprises a second set of one or more mounts such that a second datum plane is defined with the body and the clamping face in the second coupling configuration using the second set of mounts, and the first datum plane and the second datum plane are substantially the same plane.
13. The workstation of any one of the preceding embodiments, further comprising:
   a first support arm;
   a second support arm;
   a support bar, wherein the body comprises a third set of one or more mounts, the body comprises a fourth set of one or more mounts, and, with the first support arm removably coupled to the body using the third set mounts, the second support arm removably coupled to the body using the fourth set of mounts, and the support bar removably coupled to the first support arm and the second support arm, the support bar comprises a support surface portion that is substantially in the same plane as the one or more reference surface portions.

14. The workstation of embodiment 13, wherein the body comprises a fifth set of one or more mounts, and, with the support bar removably coupled to the body using the fifth set of mounts, the support bar comprises an alignment surface portion that is substantially in the same plane as the one or more reference surface portions.

15. The workstation of any one of embodiments 1-12, further comprising:
a support bar, wherein the body comprises a third set of one or more mounts, and, with the support bar removably coupled to the body using the third set of mounts, the support bar comprises an alignment surface portion that is substantially in the same plane as the one or more reference surface portions.

16. The workstation of any one of the preceding embodiments, wherein the clamping face comprises one or more slots, and an edge of a first mounting surface portion is adjacent to a first slot of the one or more slots.

17. The workstation of embodiment 16, further comprising:
a shelf, wherein, in a sixth state, the shelf is removably coupled to the clamping face using at least one of the one or more slots.

18. The workstation of embodiment 17, wherein the shelf comprises an adjustment handle, and the adjustment handle adjusts a cam mechanism to couple a foot of the shelf to a first slot of the one or more slots.

19. The workstation of embodiment 18, wherein the adjustment handle is in a first position when the foot is in an unlocked state with respect to the first slot, and the adjustment handle is in a second position when the foot is in a clamped state with respect to the first slot.

20. The workstation of embodiment 19, wherein the adjustment handle is in third position when the foot is in an in-friction state with respect to the first slot, and the third position is between the first position and the second position.

21. The workstation of any one of the preceding embodiments, wherein the body further comprises one or more protrusions, in a seventh state, a first protrusion of the one or more protrusions protrudes from a surface of the body by a first distance, in an eighth state, the first protrusion protrudes from the surface of the body a second distance, and the second distance is greater than the first distance.

22. The workstation of embodiment 21, wherein the first protrusion comprises a cam mechanism that adjusts the protrusion distance as the cam is rotated.

23. A workstation, comprising:
a body, wherein the body comprises a reference surface, the reference surface comprises one or more reference surface portions, the body comprises a mounting surface, the mounting surface comprises one or more mounting surface portions, and each reference surface portion is substantially perpendicular to each mounting surface portion.

24. The workstation of embodiment 23, wherein the body comprises a first datum pin on a mounting surface portion.

25. The workstation of embodiment 24, wherein the body comprises a second datum pin on a mounting surface portion, and the second datum pin is different from the first datum pin.

26. The workstation of any one of embodiments 24 or 25, wherein a datum plane is defined based at least in part upon the first datum pin, wherein the datum plane is substantially perpendicular to each of the mounting surface portions.

27. The workstation of any one of embodiments 24-26, wherein, with the first datum pin in a first state, the first datum pin protrudes past a first mounting surface portion of the one or more mounting surface portions, and, with the first datum pin in a second state, the first datum pin is recessed with respect to the first mounting surface portion.

28. The workstation of embodiment 27, wherein, with the second datum pin in a third state, the second datum pin protrudes past a second mounting surface portion of the one or more mounting surface portions, and, with the second datum pin in a fourth state, the second datum pin is recessed with respect to the second mounting surface portion 29. The workstation of any one of embodiments 23-28, further comprising:
a first support arm;
a second support arm;
a support bar, wherein the body comprises a first set of one or more mounts, the body comprises a second set of one or more mounts, and, with the first support arm removably coupled to the body using the first set mounts, the second support arm removably coupled to the body using the second set of mounts, and the support bar removably coupled to the first support arm and the second support arm, the support bar comprises a support surface portion that is substantially in the same plane as the one or more reference surface portions.

30. The workstation of embodiment 29, wherein the body comprises a third set of one or more mounts, and, with the support bar removably coupled to the body using the third set of mounts, the support bar comprises an alignment surface portion that is substantially in the same plane as the one or more reference surface portions.

31. The workstation of any one of embodiments 23-28, further comprising:
a support bar, wherein the body comprises a first set of one or more mounts, and, with the support bar removably coupled to the body using the first set of mounts, the support bar comprises an alignment surface portion that is substantially in the same plane as the one or more reference surface portions.

32. The workstation of any one of embodiments 29-31, wherein the support bar comprises a lock handle, and the lock handle adjusts a cam mechanism to couple the support bar to the first support arm or the body.

33. The workstation of any one of embodiments 23-32, wherein the body comprises one or more slots, and an edge of a first mounting surface portion is adjacent to a first slot of the one or more slots.

34. The workstation of embodiment 33, further comprising:
a shelf, wherein, in a fifth state, the shelf is removably coupled to the body using at least one of the one or more slots.

35. The workstation of embodiment 34, wherein the shelf comprises an adjustment handle, and the adjustment handle adjusts a cam mechanism to couple a foot of the shelf to a first slot of the one or more slots.

36. The workstation of embodiment 35, wherein the adjustment handle is in a first position when the foot is in a unlocked state with respect to the first slot, and the adjustment handle is in a second position when the foot is in a clamped state with respect to the first slot.
37. The workstation of embodiment 36, wherein the adjustment handle is in third position when the foot is in an in-friction state with respect to the first slot, and the third position is between the first position and the second position.
38. The workstation of any one of embodiments 23-37, wherein the body further comprises one or more protrusions, in a sixth state, a first protrusion of the one or more protrusions protrudes from a surface of the body by a first distance, in a seventh state, the first protrusion protrudes from the surface of the body a second distance, and the second distance is greater than the first distance.
39. The workstation of embodiment 38, wherein the first protrusion comprises a cam mechanism that adjusts the protrusion distance as the cam is rotated.
40. A system for performing an action related to a tool, the system comprising:
a workstation, wherein the workstation comprises a feature located at a first location on the workstation, and the workstation comprises a first component;
the tool, wherein the tool comprises a second component or the tool is adapted to receive a second component;
an image sensor;
one or more memories storing instructions; and
one or more processors, coupled to the one or more memories and the image sensor, that execute the instructions to cause performance of:
using the image sensor, capturing an image of a first portion of the workstation, wherein the image includes image data related to the feature;
determining first information related to a position of a first portion of the first component relative to a first portion of the second component, wherein the first information is based at least in part upon the image; and
triggering an action based at least in part upon the first information.
41. The system of embodiment 40, wherein the action comprises one or more of: (1) providing second information to sound an audible alert using a speaker, (2) providing third information for display on a display, or (3) providing fourth information that causes a change in a position or a motion of a third component of the tool.
42. The system of embodiment 40 or 41, wherein the first information is based at least in part upon the first location.
43. The system of any one of embodiments 40-42, wherein the first information is based at least in part upon fifth information related to a location of the first component relative to the first location.
44. The system of any one of embodiments 40-43, wherein the first information is based at least in part upon an offset between a location of the image sensor and a location of the second component.
45. The system of any one of embodiments 40-44, wherein the first information is based at least in part upon sixth information related to the geometry of the first component.
46. The system of any one of embodiments 40-45, wherein the first information is based at least in part upon seventh information related to the geometry of the second component.
47. The system of any one of embodiments 40-46, wherein the first component is a body or a clamping face of the workstation.
48. The system of embodiment 47, wherein the first portion of the first component is an edge of the body or the clamping face.
49. The system of any one of embodiments 40-48, wherein the second component is a cutting bit, and the tool is adapted to receive the cutting bit.
50. The system of embodiment 49, wherein first portion of the second component is a tip of the cutting bit.
51. The system of embodiment 49, wherein first portion of the second component is a cylindrical surface aligned to a long axis of the cutting bit.
52. The system of any one of embodiments 40-51, wherein the first information indicates that a distance between the first portion of the first component and the first portion of the second component is 1", 0.5", 0.25", 0.125", 0.0625", 0.03", 0.01" or less.
53. The system of any one of embodiments 41-52, wherein providing the fourth information causes movement of the third component or causes a change in motion of the third component.
54. The system of any one of embodiments 41-53, wherein the second component is the same as the third component.
55. The system of any one of embodiments 40-54, wherein a zone is defined based on the first portion of the first component, and the first information is related to a position of the first portion of the second component relative to the zone.
56. The system of embodiment 55, wherein the zone is an exclusion zone.
57. A computer-implemented method for performing an action related to a tool, wherein the tool comprises a second component or the tool is adapted to receive a second component, the method comprising:
capturing, using an image sensor coupled to a processor, an image of a first portion of a workstation, wherein the workstation comprises a feature located at a first location on the workstation, the workstation comprises a first component, and the image includes image data related to the feature;
determining, using a processor, first information related to a position of a first portion of the first component relative to a first portion of the second component, wherein the first information is based at least in part upon the image; and
triggering, using a processor, an action based on the first information.
58. Non-transitory computer readable media storing instructions for performing an action related to a tool, wherein the tool comprises a second component or the tool is adapted to receive a second component, and the instructions, when executed by a computer system, cause performance of:
capturing, using an image sensor, an image of a first portion of a workstation, wherein the workstation comprises a feature located at a first location on the workstation, the workstation comprises a first component, and the image includes image data related to the feature;
determining first information related to a position of a first portion of the first component relative to a first portion of the second component, wherein the first information is based at least in part upon the image; and
triggering an action based on the first information.

59. The workstation of any one of embodiments 1-22, further comprising:
an angle fence, wherein, in a ninth state, the angle fence is removably coupled to the clamping face.

60. The workstation of any one of embodiments 23-39, further comprising:
an angle fence, wherein, in an eight state, the angle fence is removably coupled to the clamping face.

61. The workstation of any one of embodiments 13-15, wherein the support bar comprises a lock handle, and the lock handle adjusts a cam mechanism to couple the support bar to the first support arm or the body.

What is claimed is:

1. A workstation, comprising:
a body, wherein the body comprises a reference surface, and the reference surface comprises one or more reference surface portions, wherein the body further comprises one or more protrusions, in a first state, a first protrusion of the one or more protrusions is recessed relative to a surface of the body, in a second state, the first protrusion protrudes from the surface of the body by a first distance, in an third state, the first protrusion protrudes from the surface of the body a second distance, and the second distance is greater than the first distance; and
a clamping face, wherein, in a fourth state, the clamping face is removably coupled to the body, the clamping face comprises a mounting surface, the mounting surface comprises one or more mounting surface portions, and, with the clamping face coupled to the body in a first coupling configuration, each reference surface portion is substantially perpendicular to each mounting surface portion.

2. The workstation of claim 1, wherein, with the clamping face coupled to the body in a second coupling configuration different from the first coupling configuration, each reference surface portion is substantially perpendicular to each mounting surface portion.

3. The workstation of claim 2, wherein a first position of the clamping face, relative to the body, in the first coupling configuration corresponds to a translation of a second position of the clamping face, relative to the body, in the second coupling configuration.

4. The workstation of claim 3, wherein the body comprises a set of one or more mounts for each coupling configuration of the body and the clamping face, and, in each coupling configuration, the body and the clamping face are coupled using the corresponding set of mounts.

5. The workstation of claim 4, further comprising:
one or more lock screws to couple the body and the clamping face in one or more coupling configurations, wherein each lock screw couples the body and the clamping face using a corresponding mount of the set of mounts.

6. The workstation of claim 5, wherein each lock screw secures the coupling of the body and the clamping face in less than one full turn.

7. The workstation of claim 1, wherein the clamping face comprises a first datum pin.

8. The workstation of claim 7, wherein, with the first datum pin in a fifth state, the first datum pin protrudes past a first mounting surface portion of the one or more mounting surface portions, and, with the first datum pin in a sixth state, the first datum pin is recessed with respect to the first mounting surface portion.

9. The workstation of claim 7, wherein the body comprises a first set of one or more mounts such that a first datum plane is defined with the body and the clamping face in the first coupling configuration using the first set mounts, the body comprises a second set of one or more mounts such that a second datum plane is defined with the body and the clamping face in the second coupling configuration using the second set of mounts, the first datum plane and the second datum plane are substantially the same plane, the first datum plane and the second datum plane are defined based at least in part upon the first datum pin, and the first datum plane and the second datum plane are each substantially perpendicular to each of the mounting surface portions.

10. The workstation of claim 1, further comprising:
a first support arm;
a second support arm;
a support bar, wherein the body comprises a third set of one or more mounts, the body comprises a fourth set of one or more mounts, and, with the first support arm removably coupled to the body using the third set mounts, the second support arm removably coupled to the body using the fourth set of mounts, and the support bar removably coupled to the first support arm and the second support arm, the support bar comprises a support surface portion that is substantially in the same plane as the one or more reference surface portions.

11. The workstation of claim 1, further comprising:
a support bar, wherein the body comprises a third set of one or more mounts, and, with the support bar removably coupled to the body using the third set of mounts, the support bar comprises an alignment surface portion that is substantially in the same plane as the one or more reference surface portions.

12. The workstation of claim 11, wherein the support bar comprises a lock handle, and the lock handle adjusts a cam mechanism to couple the support bar to the body.

13. The workstation of claim 1, wherein the clamping face comprises one or more slots, and an edge of a first mounting surface portion is adjacent to a first slot of the one or more slots.

14. The workstation of claim 13, further comprising:
a shelf, wherein, in a fifth state, the shelf is removably coupled to the clamping face.

15. The workstation of claim 14, wherein the shelf comprises an adjustment handle, and the adjustment handle adjusts a cam mechanism to couple a foot of the shelf to a first slot of the one or more slots.

16. The workstation of claim 15, wherein the adjustment handle is in a first position when the foot is in an unlocked state with respect to the first slot, and the adjustment handle is in a second position when the foot is in a clamped state with respect to the first slot.

17. The workstation of claim 16, wherein the adjustment handle is in third position when the foot is in an in-friction state with respect to the first slot, and the third position is between the first position and the second position.

18. The workstation of claim 1, wherein the first protrusion comprises a cam mechanism that adjusts the protrusion distance as the cam is rotated.

19. The workstation of claim 1, further comprising:
an angle fence, wherein, in a fifth state, the angle fence is removably coupled to the clamping face.

20. The workstation of claim 1, wherein, in the first coupling configuration with the first protrusion in the first state, the clamping face covers the first protrusion.

* * * * *